US009637221B2

(12) United States Patent
Moore et al.

(10) Patent No.: US 9,637,221 B2
(45) Date of Patent: May 2, 2017

(54) OPTIMIZATION OF DOWNSTREAM OPEN FAN PROPELLER POSITION AND PLACEMENT OF ACOUSTIC SENSORS

(71) Applicant: The Boeing Company, Chicago, IL (US)

(72) Inventors: Matthew David Moore, Everett, WA (US); Kelly L. Boren, Marysville, WA (US); Robin Blair Langtry, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 817 days.

(21) Appl. No.: 14/079,550

(22) Filed: Nov. 13, 2013

(65) Prior Publication Data
US 2014/0308124 A1 Oct. 16, 2014

Related U.S. Application Data

(63) Continuation-in-part of application No. 12/643,554, filed on Dec. 21, 2009, now Pat. No. 8,821,118.

(51) Int. Cl.
B64C 11/00 (2006.01)
B64C 11/30 (2006.01)
B64C 11/48 (2006.01)
B64D 27/02 (2006.01)

(52) U.S. Cl.
CPC .............. *B64C 11/003* (2013.01); *B64C 11/48* (2013.01); *B64D 2027/026* (2013.01)

(58) Field of Classification Search
CPC B64C 11/003; B64C 11/48; B64C 2027/026
See application file for complete search history.

(56) References Cited

U.S. PATENT DOCUMENTS

| 2,126,221 | A | * | 8/1938 | Sessums | ................ | B64D 35/04 |
| | | | | | | 416/1 |
| 2,979,288 | A | | 11/1961 | Klein | | |
| 3,747,343 | A | * | 7/1973 | Rosen | ....................... | F02K 3/06 |
| | | | | | | 415/119 |
| 4,131,387 | A | * | 12/1978 | Kazin | ..................... | F01D 5/141 |
| | | | | | | 415/119 |
| 4,142,697 | A | | 3/1979 | Fradenburgh | | |
| 4,883,240 | A | * | 11/1989 | Adamson | ................ | B64C 11/00 |
| | | | | | | 244/1 R |
| 4,958,289 | A | * | 9/1990 | Sum | .......................... | F02C 9/58 |
| | | | | | | 416/27 |
| 5,054,998 | A | * | 10/1991 | Davenport | .............. | B64C 11/48 |
| | | | | | | 244/110 B |
| 5,253,979 | A | | 10/1993 | Fradenburgh et al. | | |
| 5,743,489 | A | | 4/1998 | Stemme | | |

(Continued)

FOREIGN PATENT DOCUMENTS

DE 1506623 A1 7/1969
WO WO2008096124 A2 8/2008

OTHER PUBLICATIONS

International Search Report and Written Opinion dated May 31, 2011, regarding Application No. PCT/US20101057275, filed Nov. 18, 2010, 11 pages.

(Continued)

*Primary Examiner* — Igor Kershteyn
(74) *Attorney, Agent, or Firm* — Yee & Associates, P.C.

(57) ABSTRACT

A method and apparatus for controlling a propeller of a contra-rotation open fan (CROF) engine of an aircraft is provided. A diameter of the propeller is set to be at a first diameter during at least a portion of a first flight condition of the aircraft. The diameter of the propeller is set to be at a second diameter, different from the first diameter, during at least a portion of a second flight condition of the aircraft.

20 Claims, 25 Drawing Sheets

(56) References Cited

U.S. PATENT DOCUMENTS

| 6,030,177 | A | 2/2000 | Hager |
|---|---|---|---|
| 7,004,427 | B2 | 2/2006 | Gerbino |
| 2004/0144892 | A1 | 7/2004 | Gerbino |
| 2010/0206982 | A1 | 8/2010 | Moore et al. |
| 2011/0150645 | A1 | 6/2011 | Moore et al. |

OTHER PUBLICATIONS

Magliozzi, "Noise Characteristics of Model Counter-Rotating Prop-Fans," AIAA 11th Aeroacoustics Conference, Oct. 19, 1987, pp. 1-13.

Chatterjee, "Emissions caps seen costing airlines $7 billion a year," Jun. 9, 2009, Reuters, pp. 1-2. http://www.reuters.com/article/2009/06/09/us-airlines-carbon-idUSTRE55718G20090609.

"Low Frequency Noise Study," Partner, pp. 1-2, http://partner.mit.edu/projects/low-frequency-noise-study, accessed Dec. 4, 2013.

"Lufthansa hits Night Ban", Feb. 18, 2009, Journal of Commerce, pp. 1-2, https://www.joc.com/air-cargo/lufthansahits-night0ban_20090217, accessed Dec. 4, 2013.

Sheahan, "Lufthansa Cargo says Night Flight Ban Would Hurt", Reuters Limited, Jun. 2, 2009, pp. 1-2. http://newsclips.web.boeing.com/newsclips/story.cfm?story_id=3117720&srchwrds=Lufthansa.

"Bring on the Night or Lose Frankfurt as a Cargo Hub," Cargo News Asia, Jun. 8, 2009, pp. 1-2. http://newsclips.web.boeing.com/newsclips/story.cfm?story_id=3129290.

Office Action, dated Mar. 29, 2013, regarding USPTO U.S. Appl. No. 12/643,554, 9 pages.

Notice of Allowance, dated Sep. 4, 2013, regarding USPTO U.S. Appl. No. 12/643,554, 6 pages.

Office Action, dated Dec. 26, 2013, regarding USPTO U.S. Appl. No. 12/643,554, 8 pages.

* cited by examiner

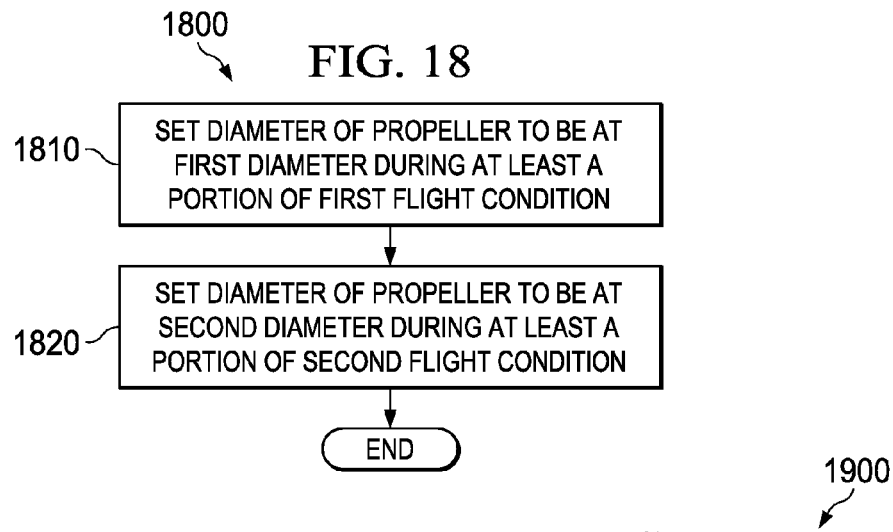
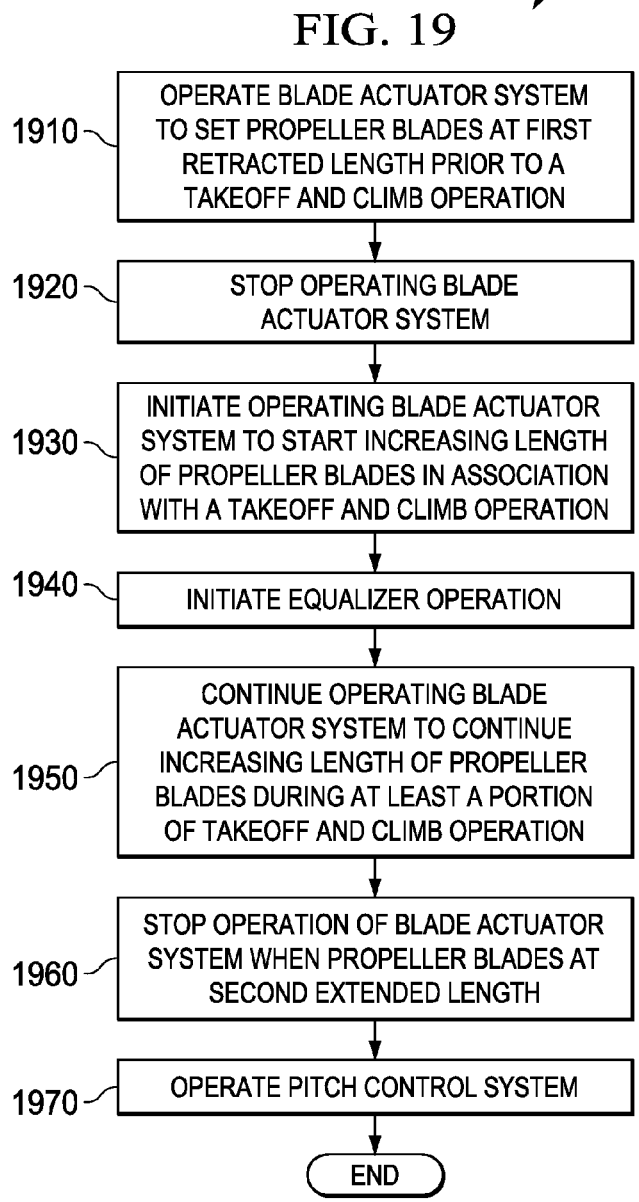

OPTIMIZATION OF DOWNSTREAM OPEN FAN PROPELLER POSITION AND PLACEMENT OF ACOUSTIC SENSORS

CROSS-REFERENCE TO RELATED APPLICATION

This application is a continuation-in-part application of U.S. patent application Ser. No. 12/643,554, filed Dec. 21, 2009, the disclosure of which is incorporated by reference herein in its entirety.

FIELD

The present disclosure relates generally to propulsion systems, such as aircraft propulsion systems and, in particular, to a method and apparatus for an aircraft propulsion system. Still more particularly, the present disclosure relates to a method and apparatus for optimizing the position of a downstream propeller of a contra-rotation open fan engine.

BACKGROUND

Current contra-rotation open fan (CROF) propeller systems for CROF aircraft engines require some degree of "cropping" of the blades of the downstream propeller in order to reduce takeoff community noise due to natural contraction of the stream tube beyond the upstream propeller. Current legal noise limits and local airport noise regulations may require cropping of the blades by an amount sufficient to reduce the diameter of the downstream propeller by twenty percent or more to comply with the limits and regulations.

Cropping, however, decreases the effective span, and thus lift for a given pitch of the downstream propeller, and requires an increase in pitch or re-design of the propeller airfoil to recover lost thrust to meet take-off thrust requirements. In some cases, it is not possible to meet the un-cropped thrust and aspects of a propeller re-design may further worsen fuel consumption and noise. The increased pitch, however, may result in increased drag and a degradation of off-design (take-off, climb, descent, reverse are all off-design) performance that can also increase wake-related self-noise of the cropped propeller.

The unacceptable noise levels encountered during takeoff by an aircraft having one or more CROF engines is driven by wake interaction and Blade Vortex Interaction (BVI) noise. BVI noise is caused by the fact that tip vortices created by the upstream propeller tend to decay in a radial inward direction toward the downstream propeller as the stream tube contracts (the contraction angles are a function of flight Mach number and aircraft angle) in such a way that the vortices are "chopped" (interacted with) by the downstream propeller at generally the most highly loaded region of the downstream propeller blades. As the downstream propeller chops these vortices, inherent blade-passage tone levels increase and new interaction tones are created. In addition, un-steady blade stress is aggravated, which may cause a need for propeller reinforcement, and additional engine vibration reinforcement/treatment resulting in increased weight and cost. Often, a thicker propeller airfoil than would be preferred for optimum performance is required for reinforcing strength, which increases wave drag that degrades propeller performance and creates noise.

The noise penalty relative to a downstream propeller that is "cropped" may be up to 6EPN (Effective Perceived Noise) dB (cumulative to the three current certification measurement point rules). While the tips of the downstream propeller blades are not always literally "cropped" (i.e., cut), a downstream propeller having a shorter diameter than the upstream propeller is generally referred to by those skilled in the art as being "cropped".

Reducing the diameter of the downstream propeller of a CROF propeller system of a CROF aircraft engine holds to the same aerodynamic principles as reducing the effective wing-span of the aircraft, and results in a direct reduction in aerodynamic efficiency, which for a CROF engine can be as much as five percent cruise SFC (Specific Fuel Consumption). The typical airplane level Block Fuel penalty, encompassing the varying penalties of the overall mission segments (take-off, climb, cruise, descent) is typically slightly (1-2 percent) worse than the stated SFC penalty. Unfortunately, this fuel burn penalty is generally accepted for an entire mission even though the noise-sensitive portion of the takeoff segment may only last several minutes.

Furthermore, an airplane life cycle can be 20-30 years and, during this lifetime, legal noise certification standards as well as local airport regulations typically increase in stringency. In order to avoid costly modifications early in the airplane and engine product life-cycles, these factors can drive even greater aggressiveness in engine performance compromises to ensure the current vehicle design can meet possible future noise requirements at the time the customer takes delivery.

One proposed approach to solving the CROF noise problem is to drastically alter the aircraft general arrangement and configuration to shield/contain the noise produced by the propeller system. For an equivalent class of payload-range requirements, however, this type of solution generally involves unacceptable penalties including increased TAROC (total airplane related operating costs) due to increased airplane mass (OEW) per unit payload, degraded drag due to increased wetted area and center of gravity trim, and an additional engine specific fuel consumption penalty related to how the engine is installed in the presence of the airframe, wing, and control surfaces. In addition, these alternative options often result in an unacceptable engine-to-engine proximity for fratricide avoidance, airplane loadability, and an engine location that becomes inaccessible for maintenance and service.

Therefore, it would be advantageous to have a method and apparatus that takes into account one or more of the issues discussed above, as well as possibly other issues.

SUMMARY

In one advantageous embodiment, a method is presented for controlling a propeller of a contra-rotation open fan (CROF) engine of an aircraft. A diameter of the propeller is set to be at a first diameter during at least a portion of a first flight condition of the aircraft. The diameter of the propeller is set to be at a second diameter, different from the first diameter, during at least a portion of a second flight condition of the aircraft. The setting is accomplished using at least one electric motor.

In another advantageous embodiment, an apparatus comprises a contra-rotation open fan (CROF) engine having a plurality of propellers; and an electrically-powered actuator. The actuator is for setting a diameter of a propeller of the plurality of propellers at a first diameter during at least a portion of a first flight condition of an aircraft. The actuator is for setting the diameter of the propeller to be at a second diameter, different from the first diameter, during at least a portion of a second flight condition of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, and further objectives and advantages thereof, will best be understood by reference to the following detailed description of an advantageous embodiment of the present disclosure when read in conjunction with the accompanying drawings, wherein:

FIG. 18 is an illustration of a flowchart that depicts a process for controlling a propeller in an aircraft engine of an aircraft in accordance with an advantageous embodiment;

FIG. 19 is an illustration of a flowchart that depicts a process for controlling a propeller in an aircraft engine of an aircraft in accordance with an advantageous embodiment;

DETAILED DESCRIPTION

Figure 1:
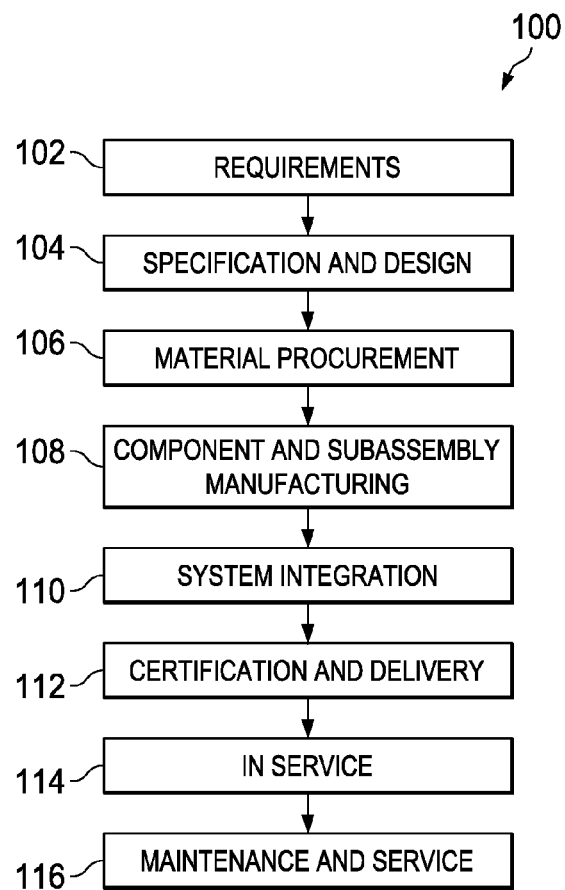
FIG. 1 is an illustration of an aircraft manufacturing and service method in accordance with an advantageous embodiment.
Figure 2:
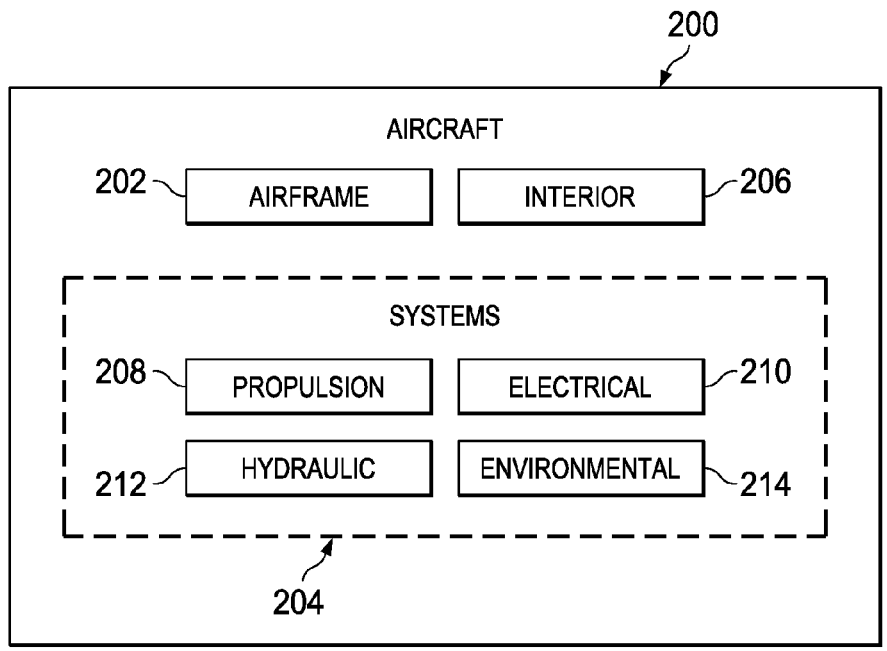
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include requirements 102 and specification and design 104 of aircraft 200 in FIG. 2 and material procurement 106.

During production, component and subassembly manufacturing 108 and system integration 110 of aircraft 200 in FIG. 2 takes place. Thereafter, aircraft 200 in FIG. 2 may go through certification testing and delivery 112 in order to be placed in service 114. While in service by a customer, aircraft 200 in FIG. 2 is scheduled for routine maintenance and service 116, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212 and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 108 in FIG. 1 may be fabricated or manufactured in a manner similar to components or subassemblies produced while aircraft 200 is in service 114 in FIG. 1. As yet another example, a number of apparatus embodiments, method embodiments, or a combination thereof may be utilized during production stages, such as component and subassembly manufacturing 108 and system integration 110 in FIG. 1.

Figure 3:
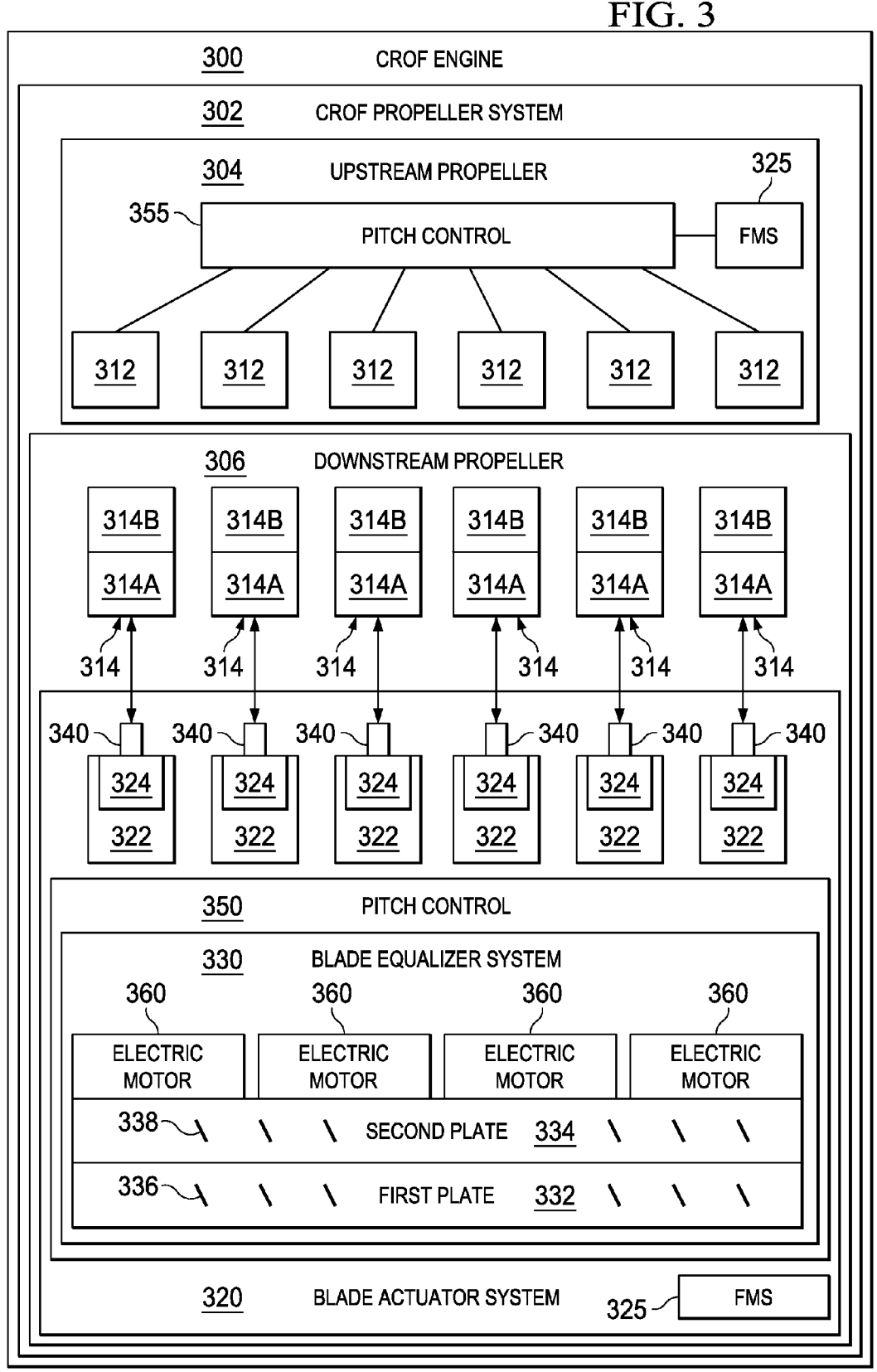
FIG. 3 is an illustration of a block diagram of an engine for an aircraft in accordance with an advantageous embodiment.

Turning now to FIG. 3, an illustration of a block diagram of an engine for an aircraft is depicted in accordance with an advantageous embodiment. The engine is generally designated by reference number 300, and in the advantageous embodiment described herein may be a contra-rotation open fan (CROF) engine. CROF engine 300 may be implemented in propulsion system 208 illustrated in FIG. 2. CROF engine 300 has a CROF propeller system 302 which may include an upstream propeller 304 and a downstream propeller 306.

Upstream propeller 304 has a plurality of upstream propeller blades 312, and downstream propeller 306 has a plurality of downstream propeller blades 314. In the advantageous embodiment illustrated in FIG. 3, upstream propeller 304 and downstream propeller 306 each have six propeller blades. It should be understood, however, that this is exemplary only as the propellers may have any desired number of propeller blades and it is not intended to limit advantageous embodiments to propellers having any particular number of propeller blades.

Upstream propeller blades 312 may have a fixed length, i.e., a fixed blade span, to provide an upstream propeller 304 having a fixed diameter. For example and without limitation, upstream propeller blades 312 may have a fixed length to form an upstream propeller 304 having a fixed diameter of from about 12 feet (144 inches) to about 14 feet (168 inches). Downstream propeller blades 314, however, may have a variable length/blade span to form a downstream propeller having a variable diameter. In particular, downstream propeller blades 314 may be varied in length from between a first retracted length 314A and a second extended length 314B. When the downstream propeller blades are at the first retracted length 314A, downstream propeller may, for example and without limitation, have a diameter that is from about five percent to about twenty percent less than the fixed diameter of the upstream propeller 304; and when the downstream propeller blades are at the second extended length 314B, downstream propeller 306 may have a diameter that is substantially equal to the fixed diameter of the upstream propeller 304.

Downstream propeller 306 also has a blade actuator system 320 for controlling the length of the downstream propeller blades 314. Blade actuator system 320 may have a plurality of blade root housings 322, each of which controls the length of one of the downstream propeller blades 314. In the advantageous embodiment described herein, blade root housings 322 are root housings which hold the base of each propeller blade root in place as the length of the downstream propeller blades 314 transitions between the first retracted length 314A and the second extended length 314B; however, it should be understood that this is intended to be exemplary only as blade actuator system 320 may take other forms and the blade root housings 322 may be powered in different ways.

In accordance with an advantageous embodiment, blade root housings 322 may help ensure that blade root housings 322 operate in unison. In this manner, the plurality of downstream propeller blades 314 are moved in unison and are maintained at the same length to avoid rotating imbalance, or uneven distribution of mass around an axis of rotation. In an embodiment, blade root housings 322 are not directly actuated but are rather trailing or slave components. Active components of blade actuator system include at least one electric motor 360 and a first plate 332 and second plate 334 whose rotation is controlled by the at least one electric motor 360.

Operation of the blade actuator system 320 may be controlled by a Flight Management System (FMS) 325 of the aircraft as shown in FIG. 3.

In order to further ensure that downstream propeller blades 314 are moved in unison and are maintained at a uniform length, blade actuator system 320 may include a blade equalizer system 330. Blade equalizer system 330 may be a trailing mechanism, not a driving mechanism, and functions as a redundancy system to prevent blade imbalance. Blade equalizer system 330 may have a first plate 332, which may be used to overcome centrifugal forces associated with the spinning of downstream propeller 306. Blade equalizer system 330 may also have a second plate 334, the rotation of which controls extension or retraction of downstream propeller 306 and which may be a cover for the downstream propeller housing. First plate 332 has a plurality of curved slots 336 and second plate 334 also has a plurality of curved slots 338 that are used in extending or retracting downstream propeller 306. A pin 340 may be attached to a moveable member 324 of each blade root housings 322. Each pin 340 protrudes through one curved slots 336 in first plate 332 and through one curved slots 338 in second plate 334. Rotation of second plate 334 under electrical power causes each of pin 340 to move in a radial fashion either inward toward the center of the propeller housing, which retracts or effectively pulls in downstream propeller 306, or outward and away from the center of the propeller housing, which extends or effectively pushes out downstream propeller 306.

In order to further ensure that the downstream propeller blades are moved in unison and are always of the same length, blade actuator system 320 may include a blade equalizer system 330. Blade equalizer system 330 is a trailing mechanism, not a driving mechanism, and functions as a redundancy system to prevent blade imbalance. Blade equalizer system 330 may have a first plate 332, which may be incorporated in a housing for the downstream propeller, and a second plate 334, which may be a cover for the downstream propeller housing and which is rigidly secured the first plate 332. First plate 332 may have a plurality of radial slots 336 therein and second plate 334 may have a plurality of spiral curved slots 338 therein. A pin 340 may be attached to a moveable member 324 of each blade root housings 322 and extends through respective aligned slots 336 and 338 in the first and second plates 332 and 334. The aligned slots 336 and 338 in the first and second plates 332 and 334 ensure that the pins 340 of each blade actuator are at the same position in their respective slots and, hence, that the moveable members 324 are moved in unison, and that the downstream propeller blades 314 attached to the moveable members 324 are moved in unison and will remain the same length. Slots 336 and 338 in the first plate 332 and second plate 334, respectively, may be aligned with each other, ensuring that pin 340 of each blade root housings 322 is maintained in the same position in its respective slots 336 and slot 338. Hence, moveable members 324 may be moved in unison, and downstream propeller blades 314 attached to the moveable members 324 also may be moved in unison and maintain the same length.

Blade actuator system 320 may include a pitch control system 350 for adjusting the pitch of the downstream propeller blades 314, and upstream propeller 304 may also include a pitch control system 355 for adjusting the pitch of upstream propeller blades 312. The pitch of the propeller blades of the upstream and downstream propellers 304 and 306 may be controlled by flight management system 325.

Blade actuator system 320 also includes at least one electric motor 360 that controls rotation of first plate 332 and second plate 334. Such rotation causes each of pin 340, in the clasp of one of each of slots 336 and 338, to move in a radial manner either inward or outward, thus either respectively retracting or extending downstream propeller blades 314. Electric motor 360 may engage gear interface of second plate 334 to rotate second plate 334 and first plate 332. While four of electric motor 360 are depicted in FIG. 3, in an embodiment blade actuator system 320 may include more than or fewer than four of electric motor 360.

Figure 4:
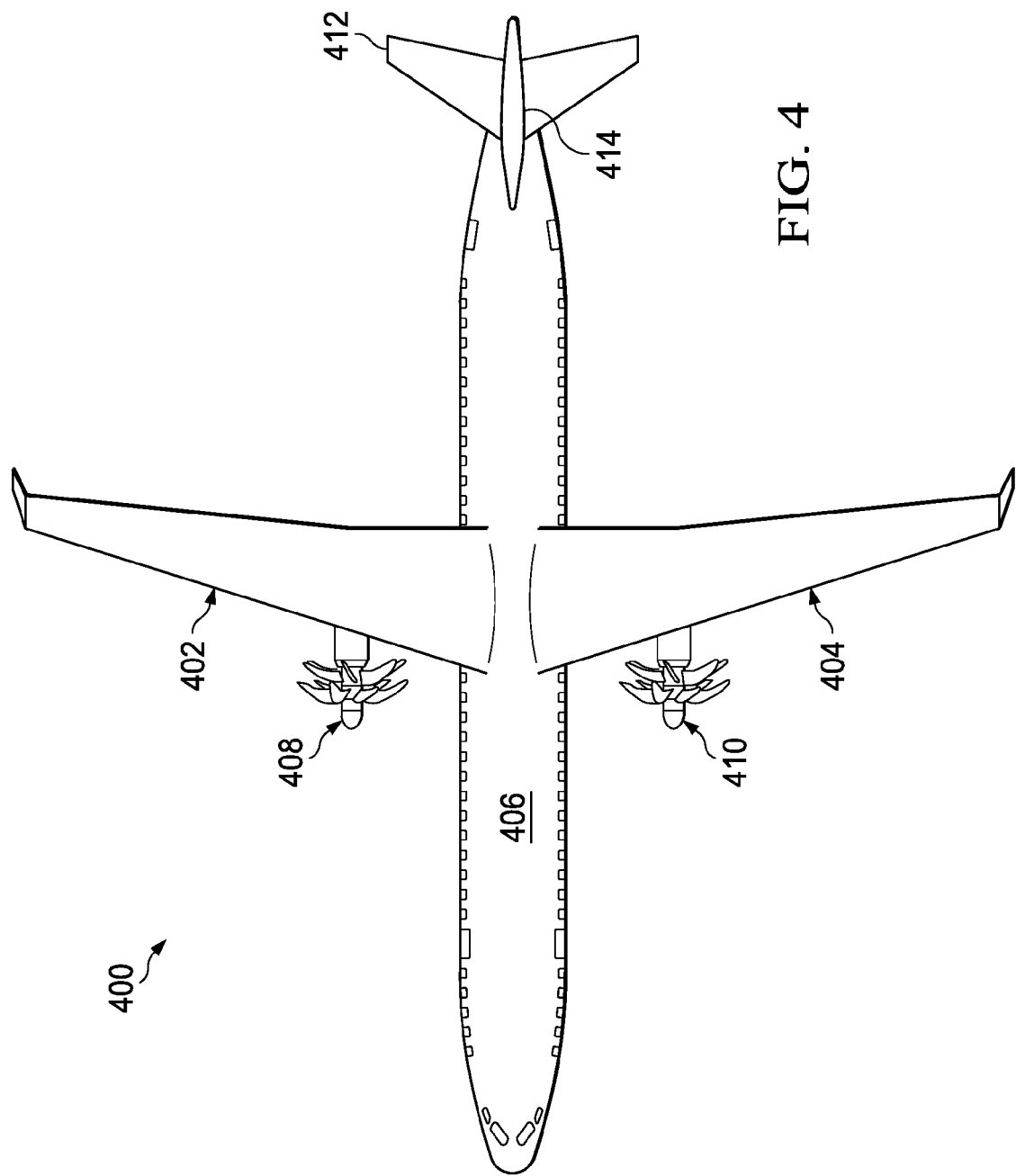
FIG. 4 is an illustration of a top view of an aircraft in which an advantageous embodiment may be implemented.

Turning now to FIG. 4, an illustration of a top view of an aircraft in which an advantageous embodiment may be implemented is depicted. Aircraft 400 may be implemented as aircraft 200 in FIG. 2. In this illustrative example, aircraft 400 has wings 402 and 404 attached to fuselage 406. Aircraft 400 also may include engine 408, engine 410, horizontal stabilizer 412 and vertical stabilizer 414.

In the advantageous embodiment described herein, engines 408 and 410 may be contra-rotation open fan (CROF) engines. It should be understood, however, that this is intended to be exemplary only, as advantageous embodiments may also include other types of engines, for example and without limitation, engines having one propeller disc or "single rotation open fan (SROF) engines. Also, it should be understood that advantageous embodiments may be utilized on different types of aircraft, be utilized on engines mounted at different locations on the aircraft and be utilized on aircraft having one or more engines.

Figure 5:
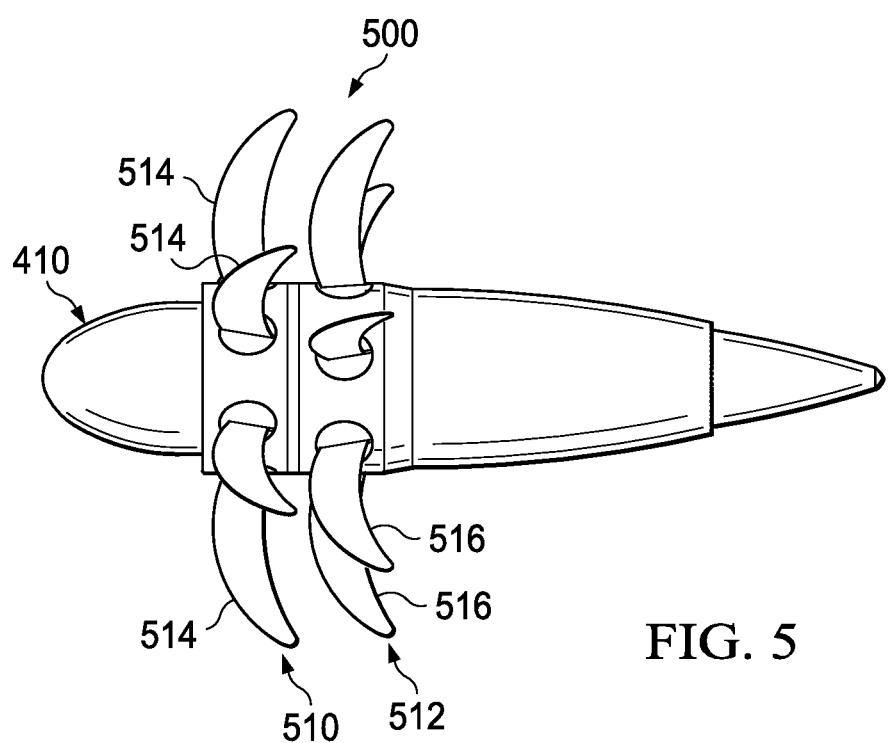
FIG. 5 is an illustration of a side view of an engine of the aircraft illustrated in FIG. 4.

Turning now to FIG. 5, an illustration of a side view of an engine of the aircraft illustrated in FIG. 4 is depicted. In particular, FIG. 5 illustrates wing mounted engine 410 depicted in FIG. 4 in greater detail. Engine 410 is a CROF aircraft engine and has a CROF propeller system 500 having two contra-rotating propellers 510 and 512. Propeller 510 is usually referred to herein as "upstream" propeller 510, and propeller 512 is usually referred to herein as "downstream" propeller 512. Upstream propeller 510 has a plurality of upstream propeller blades 514, and downstream propeller 512 has a plurality of downstream propeller blades 516. In the advantageous embodiment described herein, each propeller 510 and 512 may have six propeller blades equally spaced therearound although it should be understood that this is intended to be exemplary only as the propellers may have any desired number of propeller blades.

The propeller blades 516 of downstream propeller 512 of CROF propeller system 500 may require "cropping" during aircraft takeoff and climb in order to reduce community noise (the term "takeoff and climb" as used herein refers to the period from when an aircraft starts moving down a runway until the aircraft reaches a typical cruising speed and altitude, for example, Mach 0.8 and 35,000 feet).

Figure 6A:
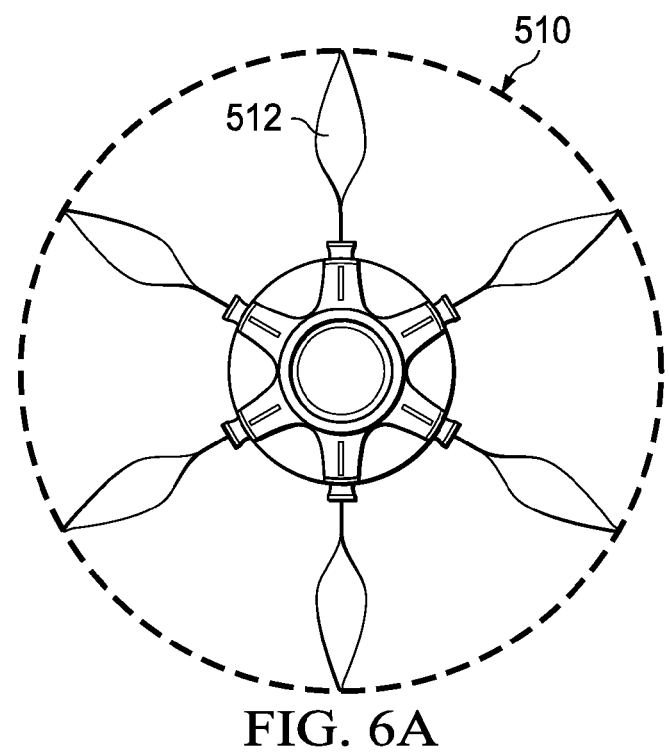
FIGS. 6A and 6B are illustrations that schematically depict the relative positions of upstream and downstream propellers and propeller blades, respectively, of a contra-rotation open fan propeller system of an aircraft without cropping of the downstream propeller blades to assist in explaining advantageous embodiments.
Figure 6B:
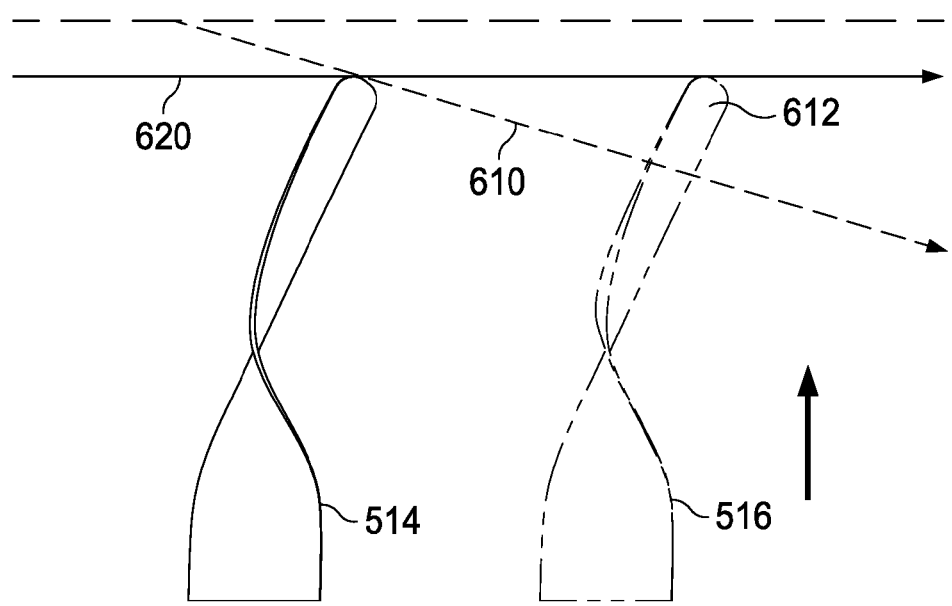
Figure 6C:
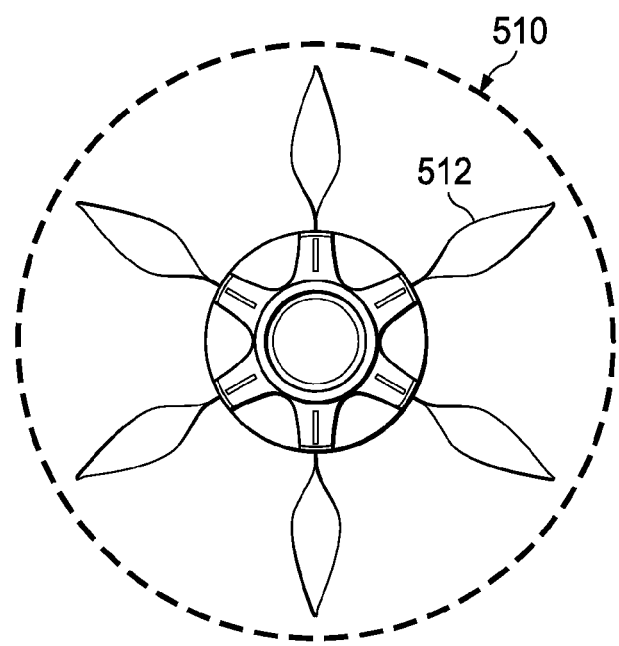
FIGS. 6C and 6D are illustrations that schematically depict the relative positions of upstream and downstream propellers and propeller blades, respectively, of a contra-rotation open fan propeller system of an aircraft with cropping of the downstream propeller blades to assist in explaining advantageous embodiments.
Figure 6D:
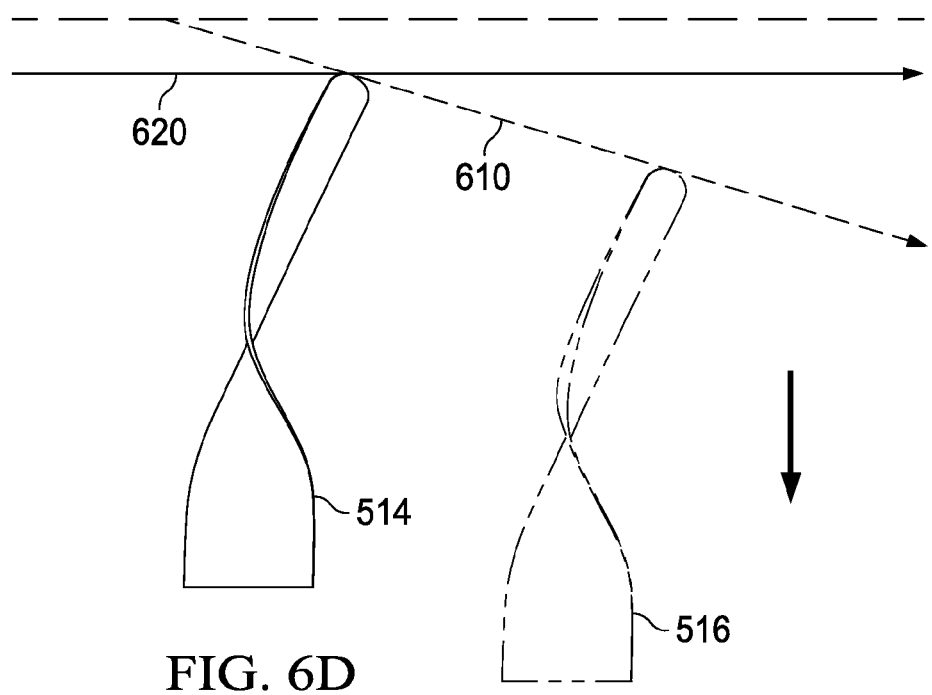

FIGS. 6A and 6B are illustrations that schematically depict the relative positions of upstream and downstream propellers and propeller blades, respectively, of a contra-rotation open fan propeller system of an aircraft without cropping of the downstream propeller blades; and FIGS. 6C and 6D are illustrations that schematically depict the relative positions of upstream and downstream propellers and propeller blades, respectively, of a contra-rotation open fan propeller system of an aircraft with cropping of the downstream propeller blades to assist in explaining advantageous embodiments.

When an aircraft is traveling at a relatively slow speed, for example, during a takeoff and climb operation, if the upstream propeller blades 514 and the downstream propeller blades 516 are of the same length, as shown in FIG. 6B, such that the upstream propeller 510 and the downstream propeller 512 have the same diameter, as shown in FIG. 6A, excessive community noise may be caused by wake interaction and Blade Vortex Interaction (BVI) noise. BVI noise is caused by the fact that tip vortices created by the upstream propeller tend to decay in a radial inward direction toward the downstream propeller as the stream tube contracts (the contraction angles are a function of flight Mach number and flight angle) in such a way that the vortex path, illustrated by dashed line 610 in FIGS. 6B and 6D is "chopped" (i.e., interacted with) by the downstream propeller blades 516 as schematically illustrated at 612 in FIG. 6B, at typically the most highly loaded region of the propeller blades. As the downstream propeller chops these vortices, inherent blade-passage tone levels increase and new interaction tones are created.

As shown in FIGS. 6C and 6D, in order to reduce community noise during takeoff, therefore, the downstream propeller blades 516 may be "cropped" such that the diameter of downstream propeller 512 is less than the diameter of upstream propeller 510 by an amount sufficient such that the downstream propeller blades 516 do not extend into the vortex path 610 as shown in FIG. 6D.

On the other hand, as also shown in FIG. 6B, during normal cruising speed, for example, at Mach 0.8, the contraction of the stream tube is nearly absent as shown by solid line 620. Accordingly, the downstream propeller blades will no longer extend into the vortex path and downstream propeller 512 may be of substantially the same diameter as the upstream propeller 510 without causing unacceptable community noise while providing maximum performance.

Although a reduction in the diameter of the downstream propeller relative to the diameter of the upstream propeller enables a reduction in community noise during a takeoff and climb operation, this reduction in diameter may also result in a reduction in propeller aerodynamic efficiency, and thus propulsive efficiency, and increased fuel consumption for the aircraft. Unfortunately, this fuel burn penalty is generally accepted for an entire flight mission even though the most noise-sensitive portion of the takeoff and climb operation may only last several minutes.

In accordance with an advantageous embodiment, an apparatus and method for controlling a propeller is provided that optimizes the position of the downstream propeller of a contra-rotation open fan propeller system during all flight conditions. According to an advantageous embodiment, a CROF engine for an aircraft has a CROF propeller system in which the length of the propeller blades of the downstream propeller are set to be at a first retracted length such that the diameter of the downstream propeller is less than the diameter of the upstream propeller during a takeoff and climb operation in order to reduce community noise, and are gradually extended in length to a second extended length as the speed of the aircraft increases during the takeoff and climb operation, until the diameter of the downstream propeller is substantially equal to the diameter of the upstream propeller at a cruising speed for the aircraft. By controlling the diameter of the downstream propeller in this manner, effective noise reduction is achieved during the takeoff and climb operation, and aircraft flight efficiency is maintained at cruising speed.

Figure 7:
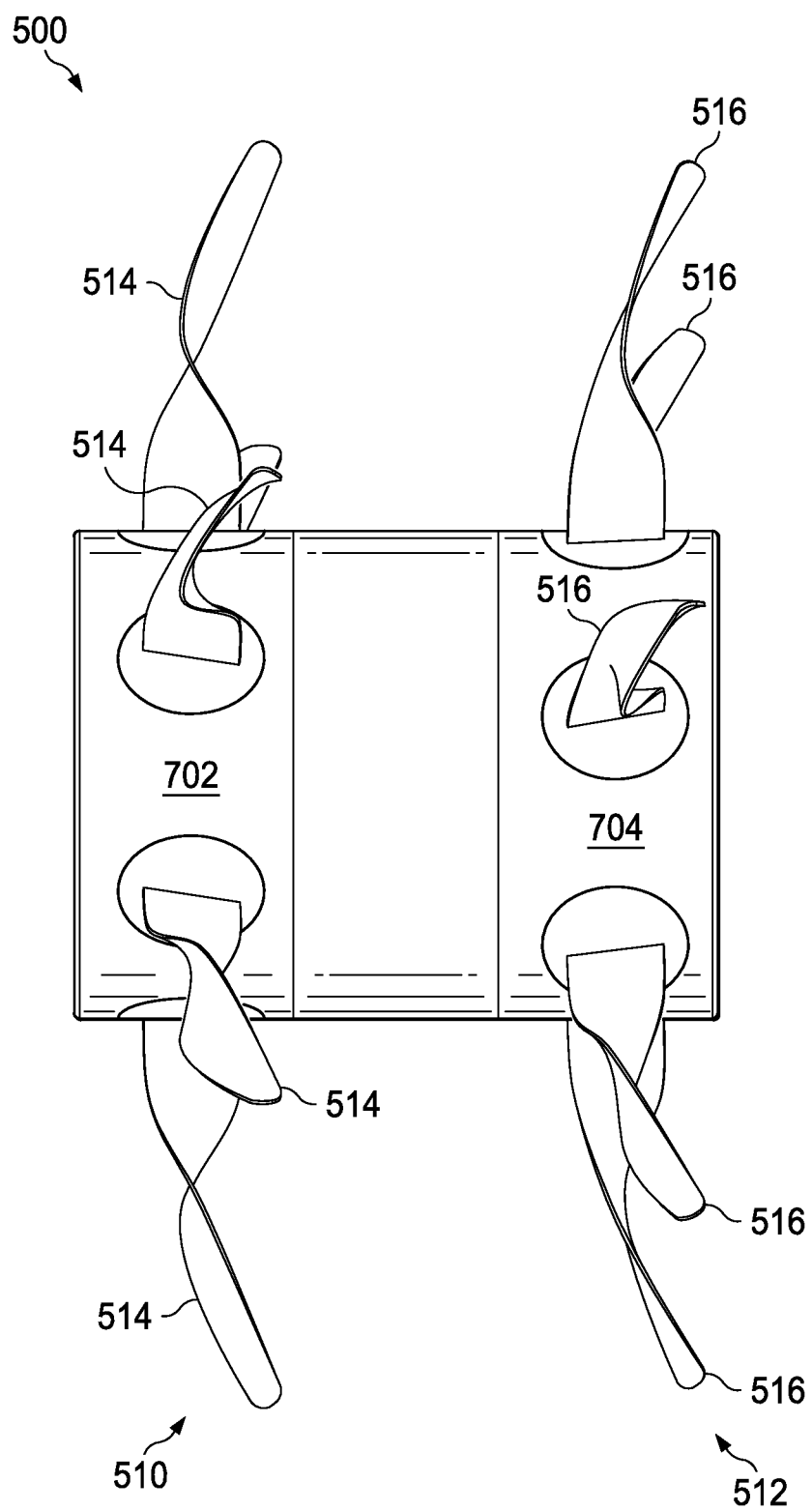
FIG. 7 is an illustration of a side perspective view of a propeller system of the contra-rotation open fan engine illustrated in FIG. 5 in accordance with an advantageous embodiment.

Turning now to FIG. 7, an illustration of a side perspective view of the propeller system of the contra-rotation open fan engine illustrated in FIG. 5 is depicted in accordance with an advantageous embodiment. As shown in FIG. 7, CROF propeller system 500 may have an upstream propeller housing 702 from which upstream propeller blades 514 of upstream propeller 510 extend, and a downstream propeller housing 704 from which downstream propeller blades 516 of downstream propeller 512 extend. As is known to those skilled in the art, upstream propeller housing 702 and downstream propeller housing 704 are rotatable in opposite directions to rotate upstream and downstream propellers 510 and 512 in opposite directions during operation of CROF propeller system 500.

As indicated previously, propeller blades 514 of upstream propeller 510 may be of a fixed length such that upstream propeller 510 is of a fixed diameter, for example and without limitation, 12-14 feet. The propeller blades 516 of downstream propeller 512, however, may have a variable length such that the diameter of downstream propeller 512 may have a variable diameter. In accordance with an advantageous embodiment, the propeller blades 516 of downstream propeller 512 are "cropped" to have a first retracted length during a takeoff and climb operation of an aircraft such that the diameter of the downstream propeller 512 is less than the diameter of the upstream propeller 510 during at least a portion of the takeoff and climb operation; and are gradually increased in length as the speed of the aircraft increases until the propeller blades of the downstream propeller are at a second extended length that is substantially equal to the fixed length of the propeller blades of the upstream propeller such that the diameter of the downstream propeller is substantially equal to the fixed diameter of the upstream propeller at cruising speed.

Figure 8:
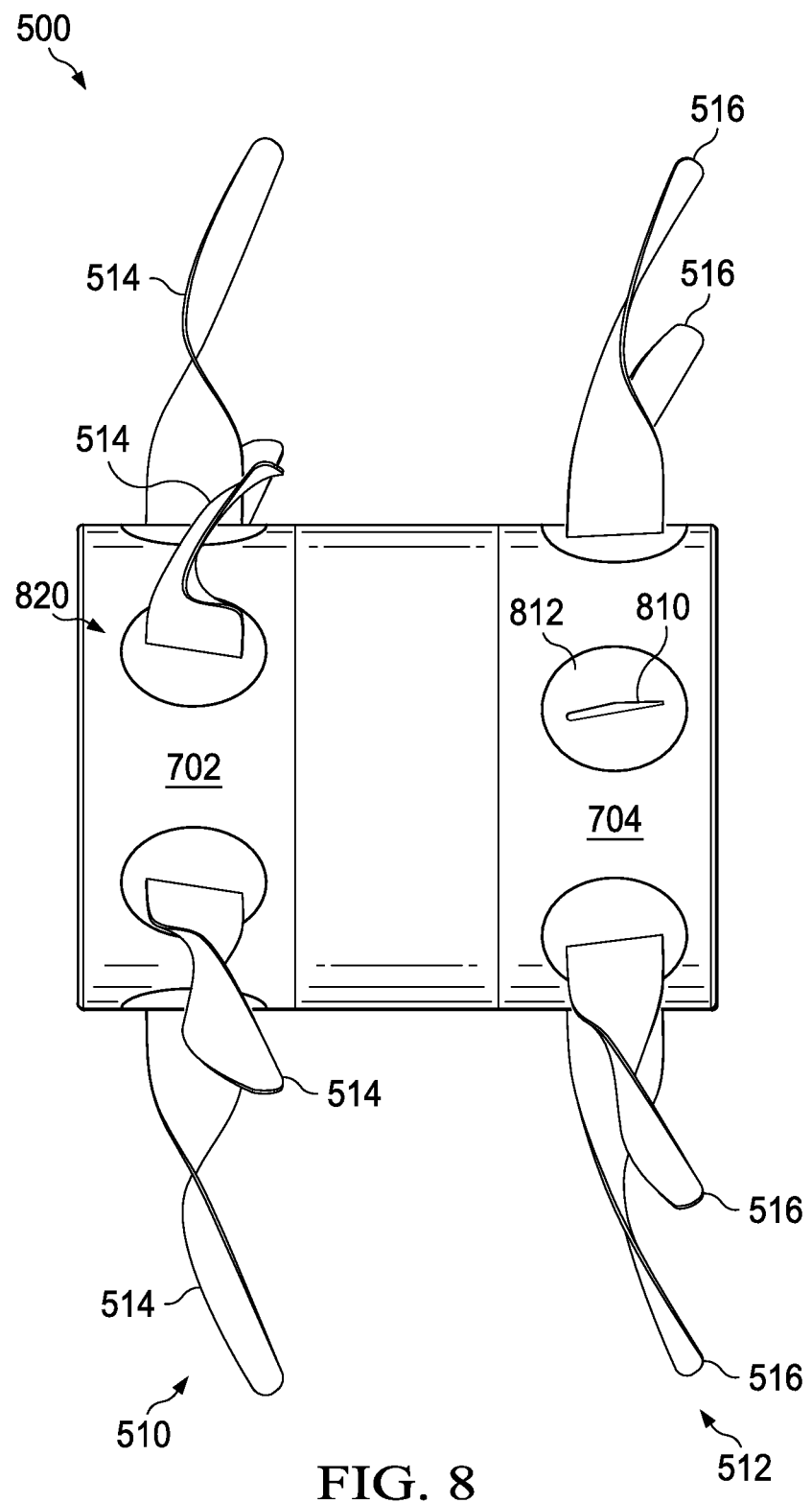
FIG. 8 is an illustration of a side perspective view of the propeller system illustrated in FIG. 7 with a downstream propeller blade removed to illustrate features of the propeller system in accordance with an advantageous embodiment.

Turning now to FIG. 8, an illustration of a side perspective view of the CROF propeller system illustrated in FIG. 7 is depicted with a propeller blade of the downstream propeller removed to illustrate features of the propeller system in accordance with an advantageous embodiment. In particular, as shown in FIG. 8, each downstream propeller blade 516 extends through a slot 810 in a generally circular-shaped plate 812 in sidewall of downstream propeller housing 704. As will be explained hereinafter, each circular-shaped plate 812 is incorporated in a pitch control system of a downstream propeller blade actuator system, and is rotatable to, in turn, rotate the propeller blades 516 of the downstream propeller 512 to provide pitch control. Upstream propeller blades 514 may also include a pitch control mechanism 820, which may be of conventional type, to provide pitch control of propeller blades 514 of upstream propeller 510.

In an embodiment, systems provided herein may concurrently promote propeller diameter changes and pitch changes. Flight management system 325 depicted in FIG. 3 may determine an optimal pitch for a given propeller diameter. As the span of a propeller airfoil increases the overall lift increases and therefore less propeller pitch may be required to achieve the necessary thrust and desired performance. Actions of flight management system 325 may lead to reduced noise given that less pitch equates to less self-noise. Test data may be used to derive optimum pitch relationship with span for performance. An optimum pitch relationship with span for noise may be derived from test data or dynamically and in real-time situations using measured acoustic data.

Figure 9A:
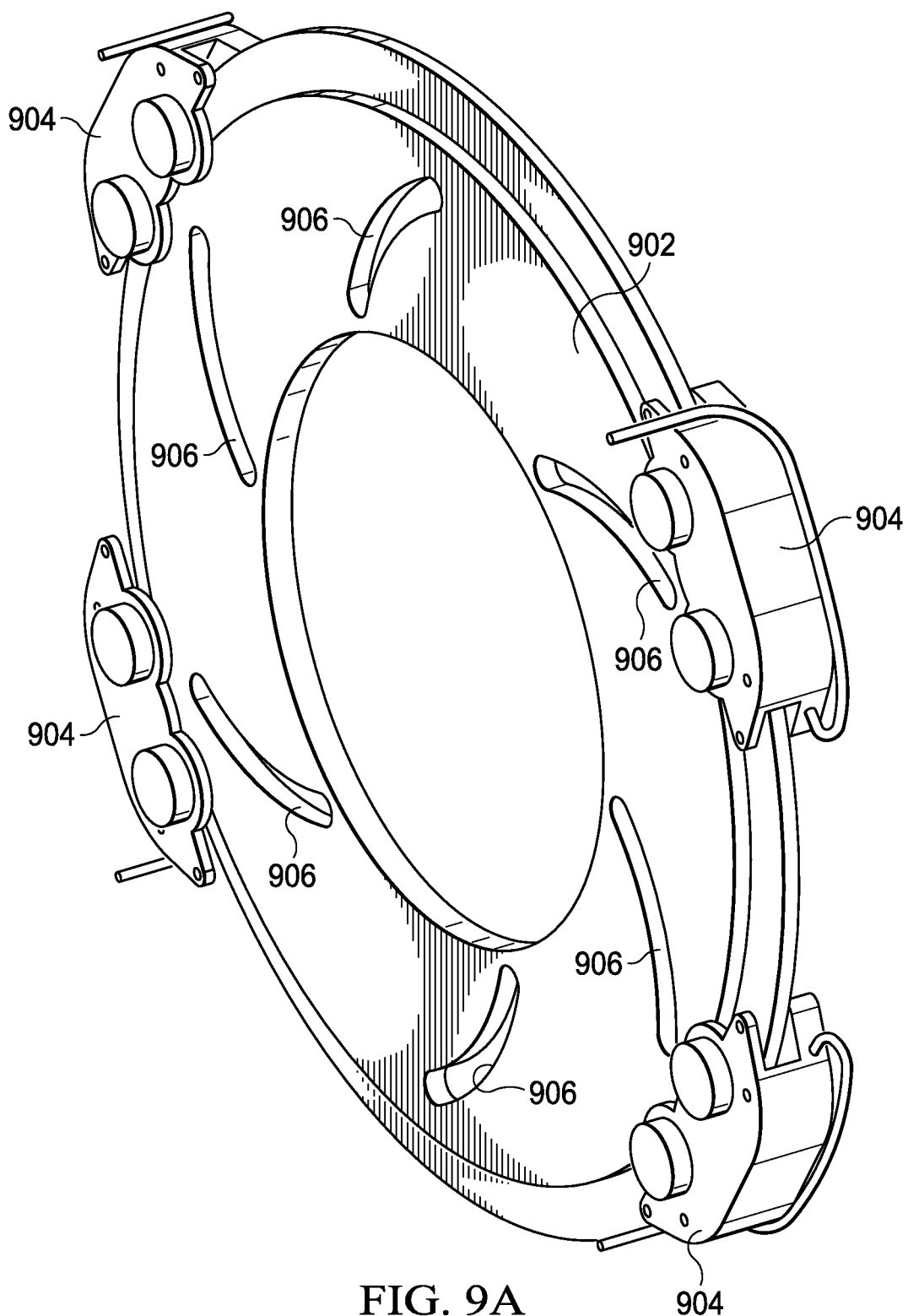
FIGS. 9A and 9B are illustrations of the interior of the downstream propeller housing of the propeller system illustrated in FIG. 7 to show a blade actuator system in accordance with an advantageous embodiment.
Figure 9B:
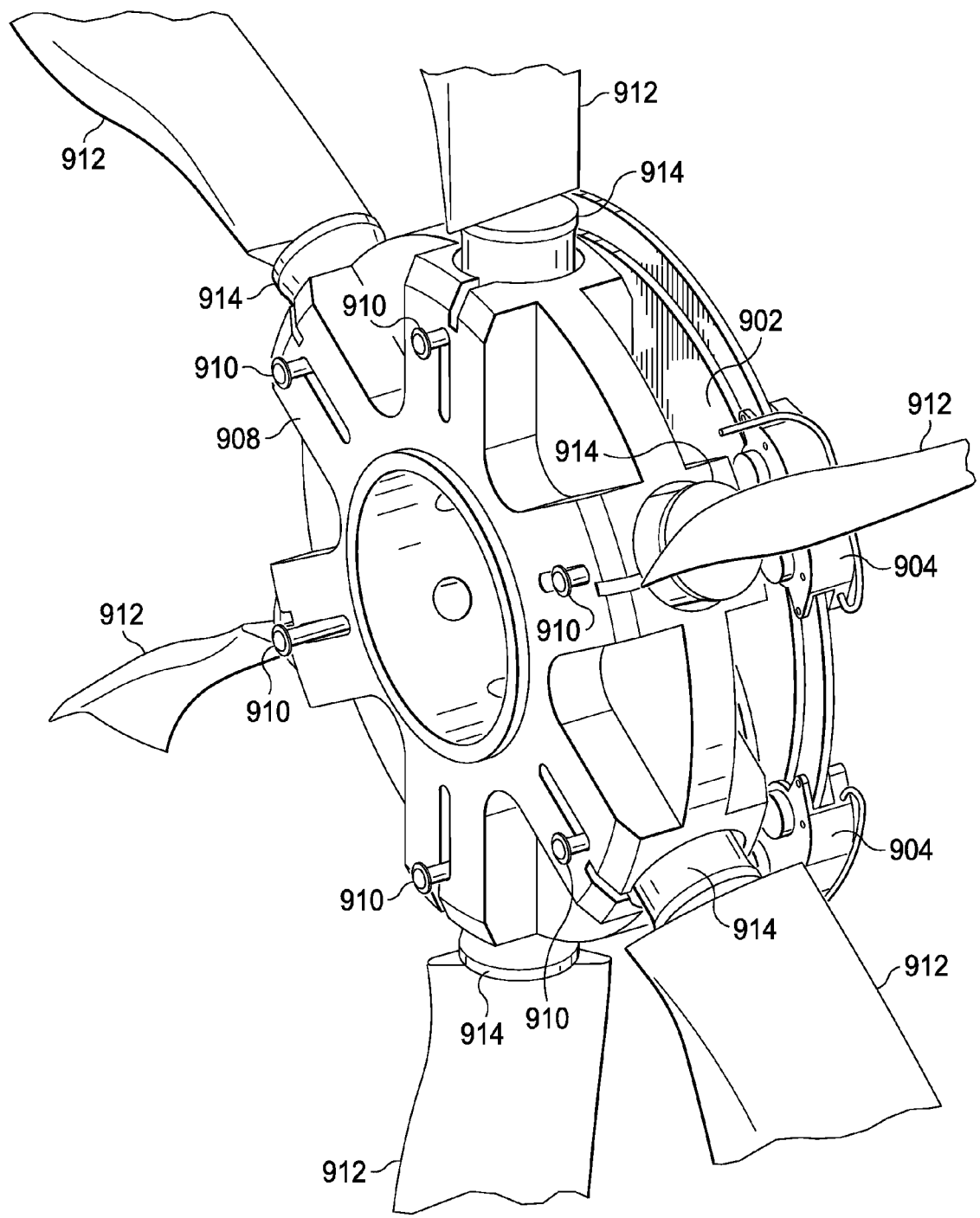

With reference now to FIGS. 9-11, FIGS. 9A and 9B, FIGS. 10A, 10B, and 10C, and FIG. 11 depict components of blade actuator system as the components are progressively "layered" on one another for illustration purposes. FIGS. 9A and 9B are illustrations of the interior of the downstream propeller housing of the propeller system illustrated in FIG. 7 to show a blade actuator system in accordance with an advantageous embodiment. Beginning with FIG. 9A, a first plate 902 is provided that may correspond to first plate 332 of FIG. 3. Four of caliper 904 are associated with first plate 902 that may apply braking pressure on first plate 902 to control centrifugal force associated with spinning of downstream propeller. First plate 902 also has six of curved slots 906. Curved slots 906 may correspond to curves slots 336 depicted in FIG. 3. In an embodiment, first plate 902 may have more than or fewer than six curved slots 906.

Figure 10A:
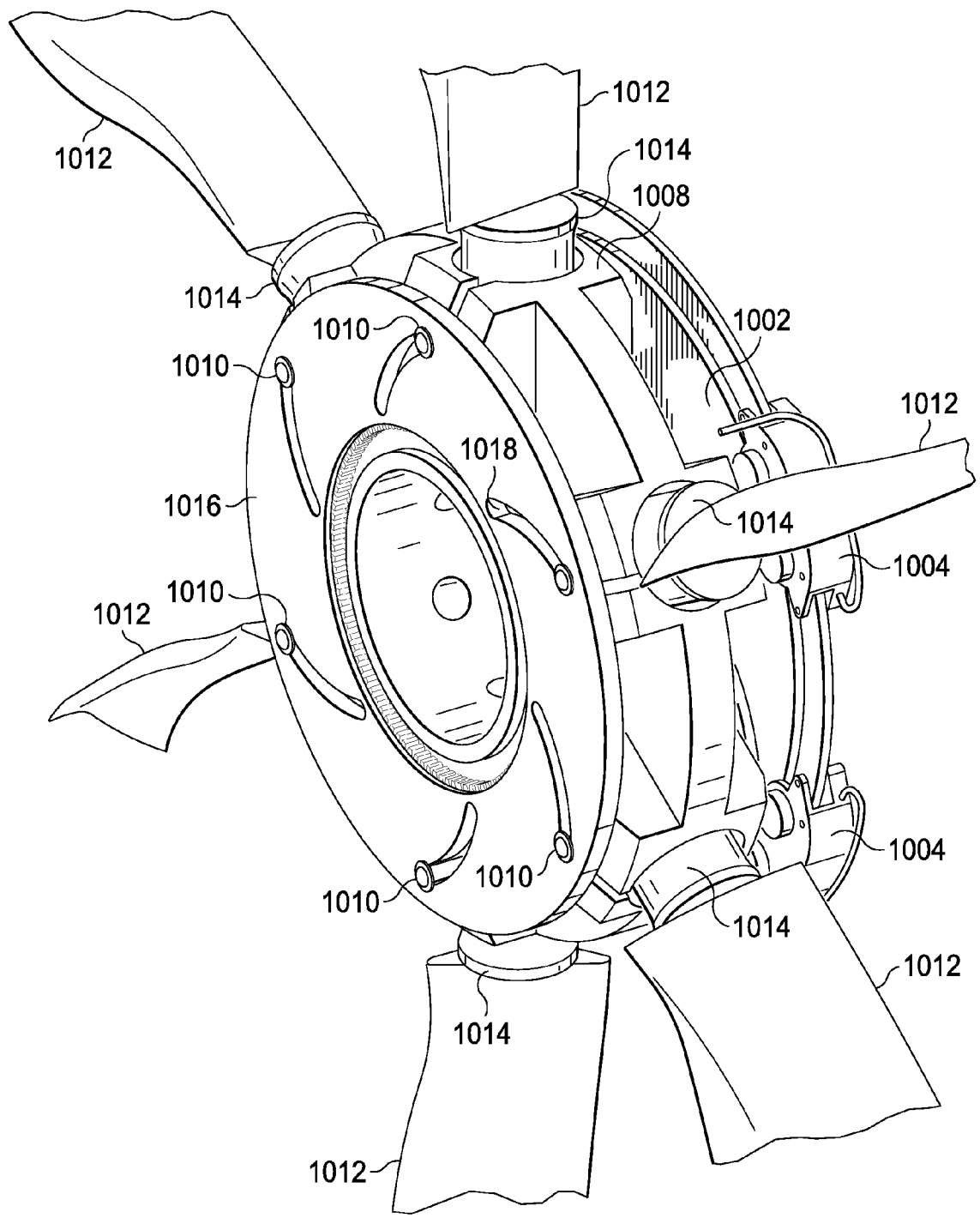
FIGS. 10A, 10B, and 10C are illustrations of the interior of the downstream propeller housing of the propeller system illustrated in FIG. 7 to show a blade actuator system in accordance with an advantageous embodiment.
Figure 10B:
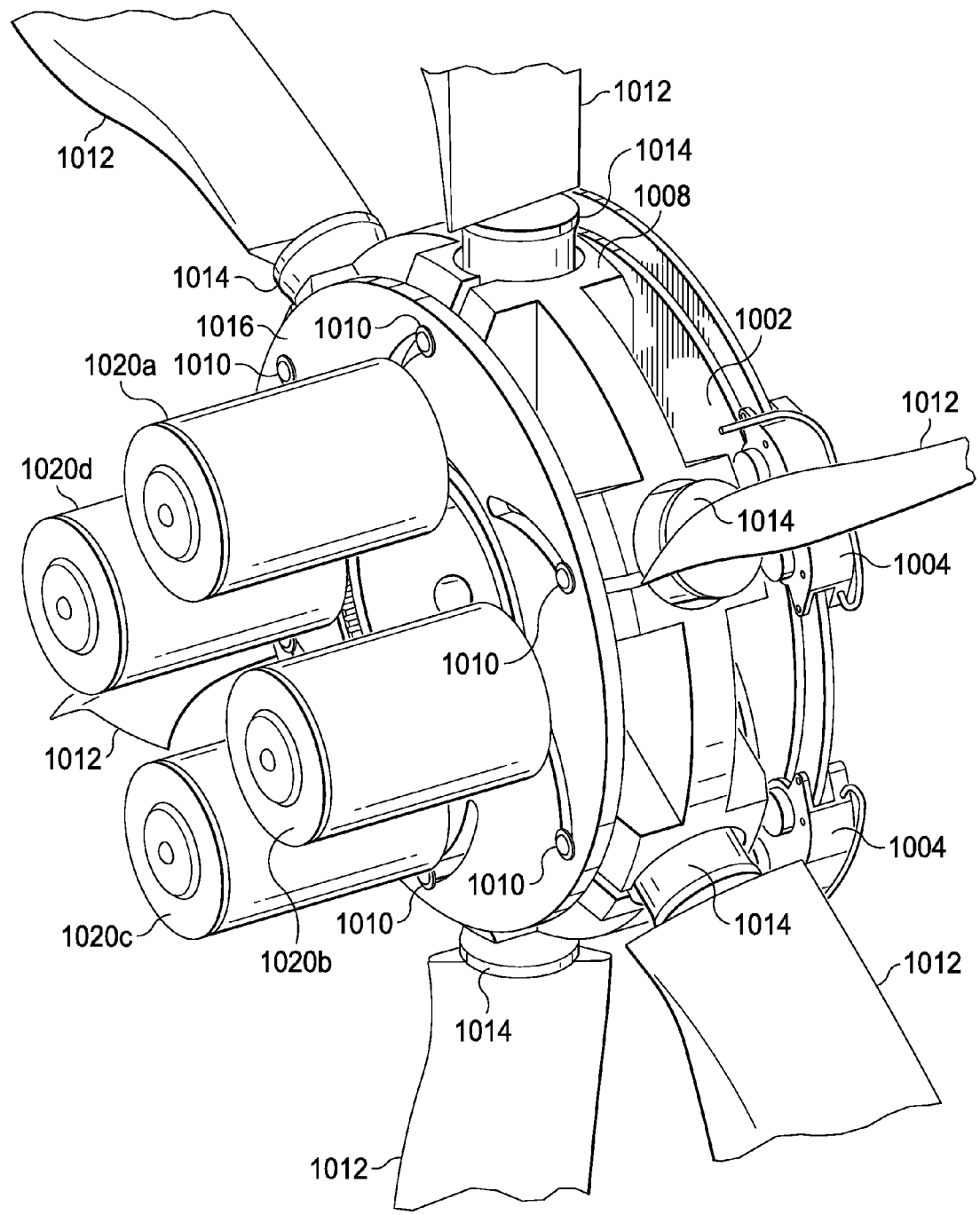
Figure 10C:
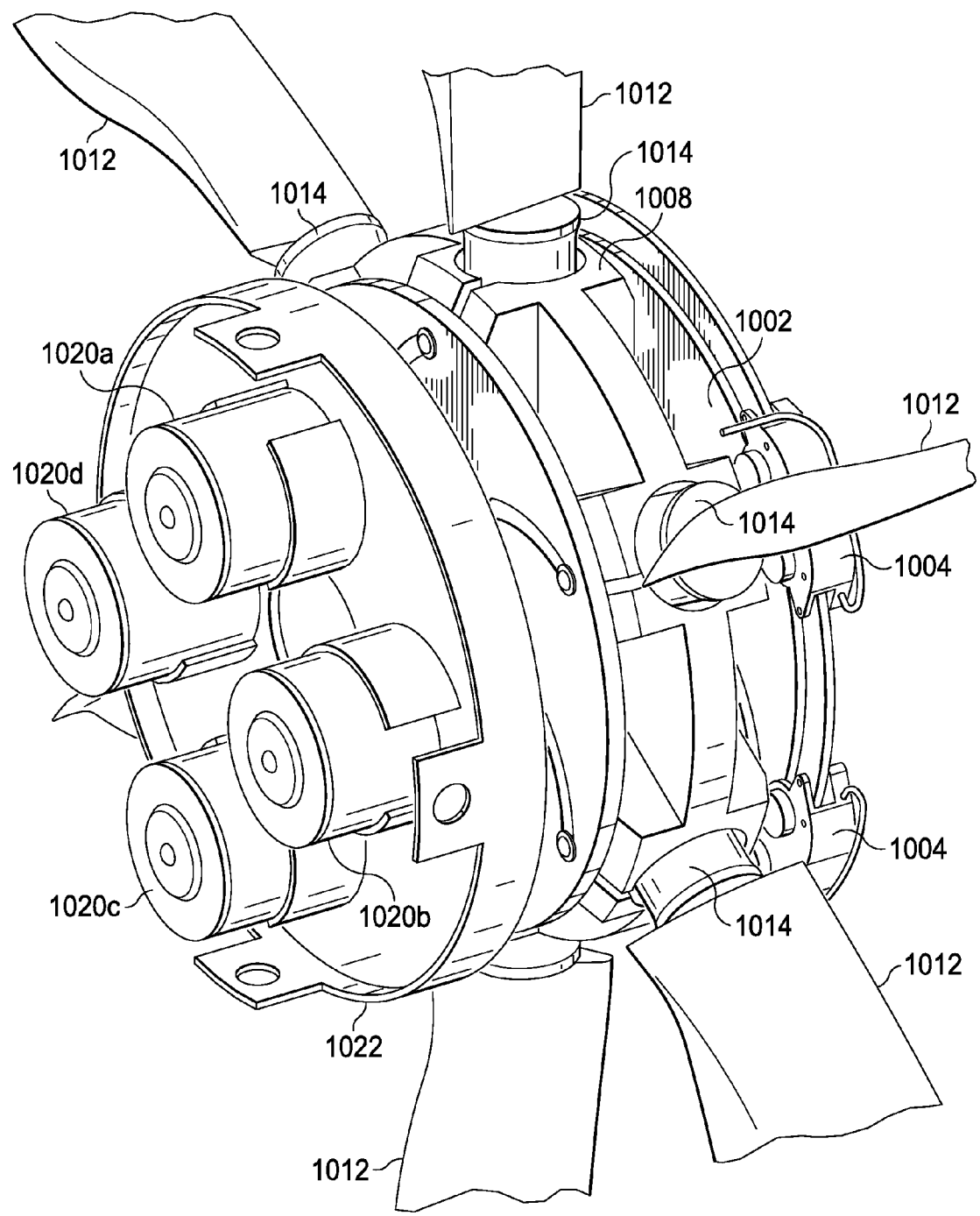

FIG. 9B depicts components provided in FIG. 9A with further components added. Downstream propeller housing 908 covers first plate 902 and has six radial slots within each of which one pin 910 moves in a radial manner toward or away from the center of downstream propeller housing 908. Each of pin 910 is held by one of curved slots 906 of first plate 902, although not visible in FIG. 9B. FIG. 9B also includes propeller blades 912 and blade root housings 914 to which propeller blades 912 are attached. Each of pin 910 is attached to one blade root housings 914 and guides movement of blade root housings 914 and connected propeller blade 912 in an extending or retracting manner. Movement of each pin 910 within its radial slot in downstream propeller housing 908 inward or outward in a radial manner moves blade root housings 914 and connected propeller blade 912 in a retracting or extending action, respectively. FIGS. 10A, 10B, and 10C are illustrations of the interior of the downstream propeller housing of the propeller system illustrated in FIG. 7 to show a blade actuator system in accordance with an advantageous embodiment. FIG. 10A depicts components provided FIG. 9A and FIG. 9B with a second plate 1016 added.

Components in FIG. 10A, FIG. 10B, and FIG. 10C are indexed to components of FIG. 9A and FIG. 9B. First plate 1002, calipers 1004, downstream propeller housing 1008, pins 1010, propeller blades 1012, and blade root housings 1014 selectively depicted in FIG. 10A, FIG. 10B, and FIG. 10C correspond to first plate 902, calipers 904, downstream propeller housing 908, pins 910, propeller blades 912, and blade root housings 914 depicted in FIG. 9B. Second plate 1016 is attached to front of downstream propeller housing 1008. Second plate 1016, similar to first plate 1002, has six curved slots 1018 through each of which one of pin 1010 protrudes. As second plate 1016 is rotated in a clockwise manner, pins 1010 are drawn inward toward the center of downstream propeller housing 1008 because of the curvature of slots 1018. As second plate 1016 is rotated in a counterclockwise direction, pins 1010 are pushed outward or away from the center of downstream propeller housing 1008, also because of the curvature of slots 1018. Rotation of second plate 1016 causes pins 1010 to move in a radial fashion inward or outward toward or away from, respectively, center of downstream propeller housing 1008. Such movement of pins 1010 in turn causes retraction or extension, respectively, of blade root housings 1014 and propeller blades 1012.

FIG. 10B depicts components depicted in FIG. 10A electric motor 1020a, electric motor 1020b, electric motor 1020c, and electric motor 1020d provided. Electric motor 1020a, electric motor 1020b, electric motor 1020c, and electric motor 1020d engage with gear interfaces of inside ring of second plate 1016 and cause second plate 1016 to turn in one of a clockwise and a counterclockwise manner. While not visible in FIG. 10A or FIG. 10B, second plate 1016, which may be shaped as a ring, has a gear interface on its inside ring. Each of electric motor 1020a, electric motor 1020b, electric motor 1020c, and electric motor 1020d also has gear interfaces which engage with gear interfaces of second plate 1016 and turn second plate 1016 in one of a clockwise and counterclockwise manner depending on whether blade root housings 1014 and propeller blades 1012 are to be retracted or extended, respectively. While FIG. 10B depicts electric motor 1020a, electric motor 1020b, electric motor 1020c, and electric motor 1020d, in an embodiment fewer than or more than four of electric motor 1020a, electric motor 1020b, electric motor 1020c, and electric motor 1020d may be used. Further, electric motor 1020a, electric motor 1020b, electric motor 1020c, and electric motor 1020d may be identical to each other or may be different from each other.

FIG. 10C depicts components depicted in FIG. 10A and FIG. 10B with a motor cover 1022 installed over electric motor 1020a, electric motor 1020b, electric motor 1020c, and electric motor 1020d provided in FIG. 10B. Motor cover 1022 is placed over electric motor 1020a, electric motor 1020b, electric motor 1020c, and electric motor 1020d and may protect and stabilize electric motor 1020a, electric motor 1020b, electric motor 1020c, and electric motor 1020d.

Figure 11:
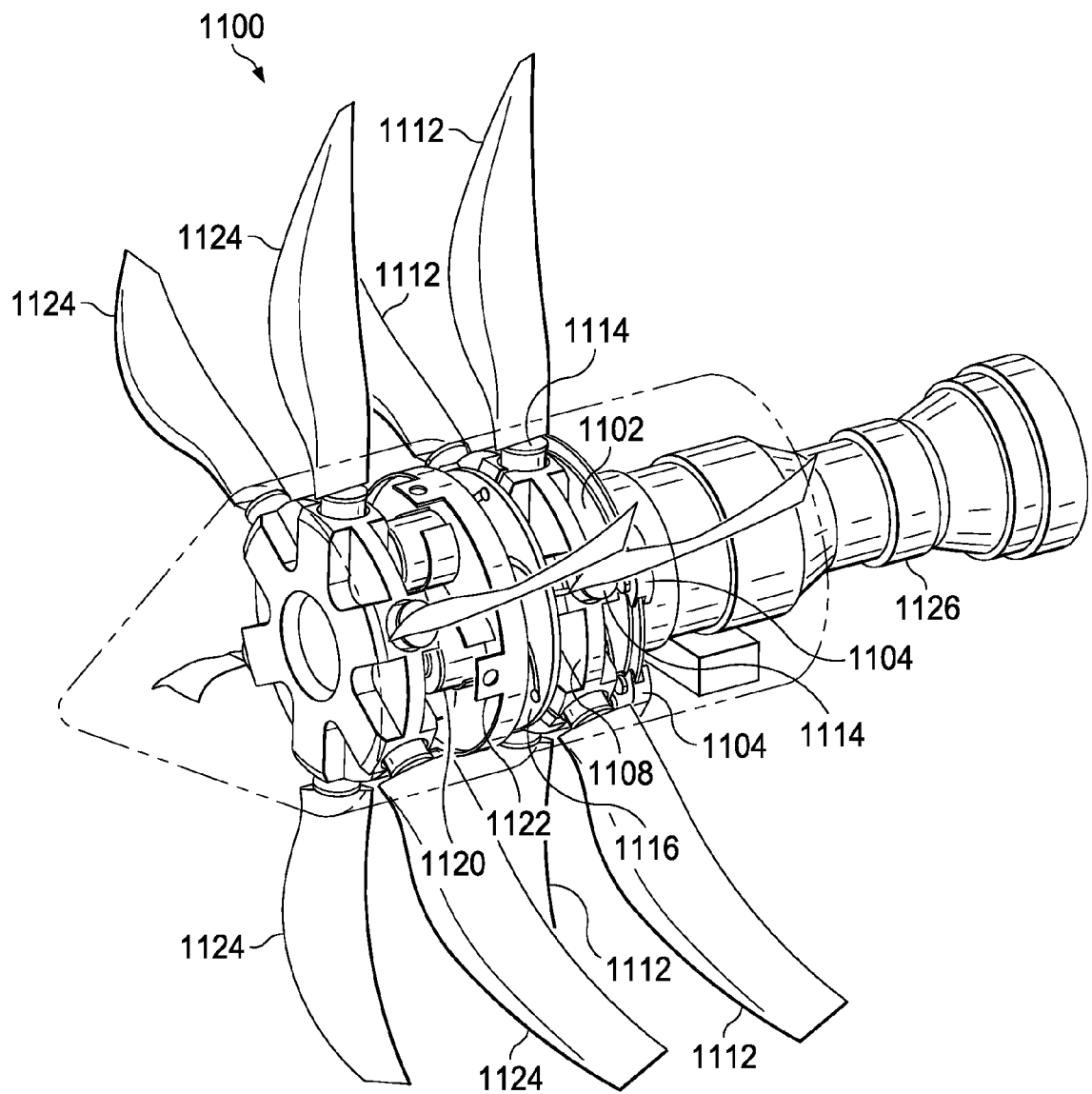
FIG. 11 is an illustration of the interior of the propeller system illustrated in FIG. 7 and the interior of the downstream propeller housing illustrated in FIGS. 9A and 9B and FIGS. 10A, 10B, and 10C to show a blade actuator system in accordance with an advantageous embodiment.

FIG. 11 is an illustration of the interior of the propeller system illustrated in FIG. 7 and the interior of the downstream propeller housing illustrated in FIGS. 9A and 9B FIGS. 10A, 10B, and 10C to show a blade actuator system in accordance with an advantageous embodiment. FIG. 11 depicts engine 1100 including components provided in FIGS. 9A and 9B and FIGS. 10A, 10B, and 10C combined with other components of engine that may correspond to CROF engine 300 provided in FIG. 3. Components in FIG. 11 are indexed to components of FIG. 10A, FIG. 10B, and FIG. 10C. First plate 1102, calipers 1104, downstream propeller housing 1108, propeller blades 1112, blade root housings 1114, second plate 1116, electric motors 1120, and motor cover 1122 selectively depicted in FIG. 11 correspond to first plate 1002, calipers 1004, downstream propeller housing 1008, propeller blades 1012, blade root housings 1014, second plate 1016, and motor cover 1022 depicted in FIGS. 10A, 10B, and 10C. Upstream propeller blades 1124 may correspond to upstream propeller blades 312 provided in FIG. 3. While only electric motor 1120a and electric motor 1120b are depicted in FIG. 11, it is understood that any one of or combinations of any two, three, or four of electric motor 1120a, electric motor 1120b, electric motor 1120c, and electric motor 1120d may be present in embodiments described by FIG. 11. Electric motor 1120a and electric motor 1120b correspond in function to electric motor 1020a, electric motor 1020b, electric motor 1020c, and electric motor 1020d depicted in FIG. 10. FIG. 11 also depicts core 1126 of engine 1100.

Figure 12:
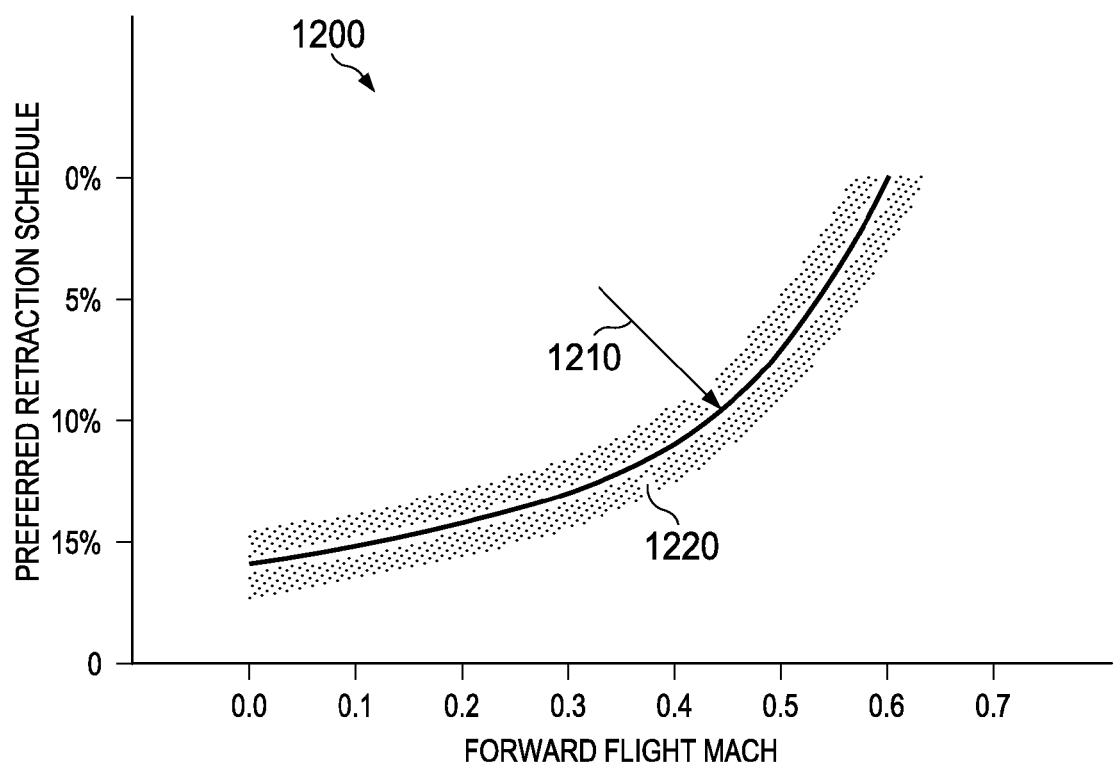
FIG. 12 is an illustration of a graph showing an exemplary retraction schedule for the downstream propeller blades of a contra-rotation open fan engine in accordance with an advantageous embodiment.

With reference now to FIG. 12, an illustration of a graph is depicted showing an exemplary retraction schedule for the downstream propeller blades of a CROF engine in accordance with an advantageous embodiment. The graph is generally designated by reference number 1200 and curve 1210 thereon represents an exemplary retraction schedule as a function of forward flight Mach number.

As shown in FIG. 12, at a forward speed of zero, the downstream propeller blades are cropped such that the diameter of the downstream propeller is typically between 15 and 25 percent less than that of the upstream propeller. As the forward flight Mach number of the aircraft increases during takeoff and climb, the downstream propeller blades are gradually extended (lengthened) until they reach a second extended length at an aircraft speed of about Mach 0.6. At this time, the downstream propeller blades and the upstream propeller blades are at substantially the same length and the diameters of the upstream propeller and the downstream propeller are also about the same.

In an embodiment, downstream propellers may be extended during takeoff roll to improve performance and reduce takeoff roll. Then, shortly after takeoff, downstream propellers may retract during noise-sensitive periods.

The shaded area 1220 in FIG. 12, on either side of curve 1210, represents an operational tolerance band to allow for acceptable schedule deviation due to but not limited to angle of attack, based on logic governed by the aircraft's FMS.

It should be understood that curve 1210 illustrated in FIG. 12 is intended to be exemplary only of a retraction schedule as other retraction schedules may also be followed. It may be desirable, however, to select a retraction schedule that maximizes efficiency of the aircraft. In this regard, FIG. 13 is an illustration of a graph that depicts the effect of cropping on aircraft efficiency and noise.

Figure 13:
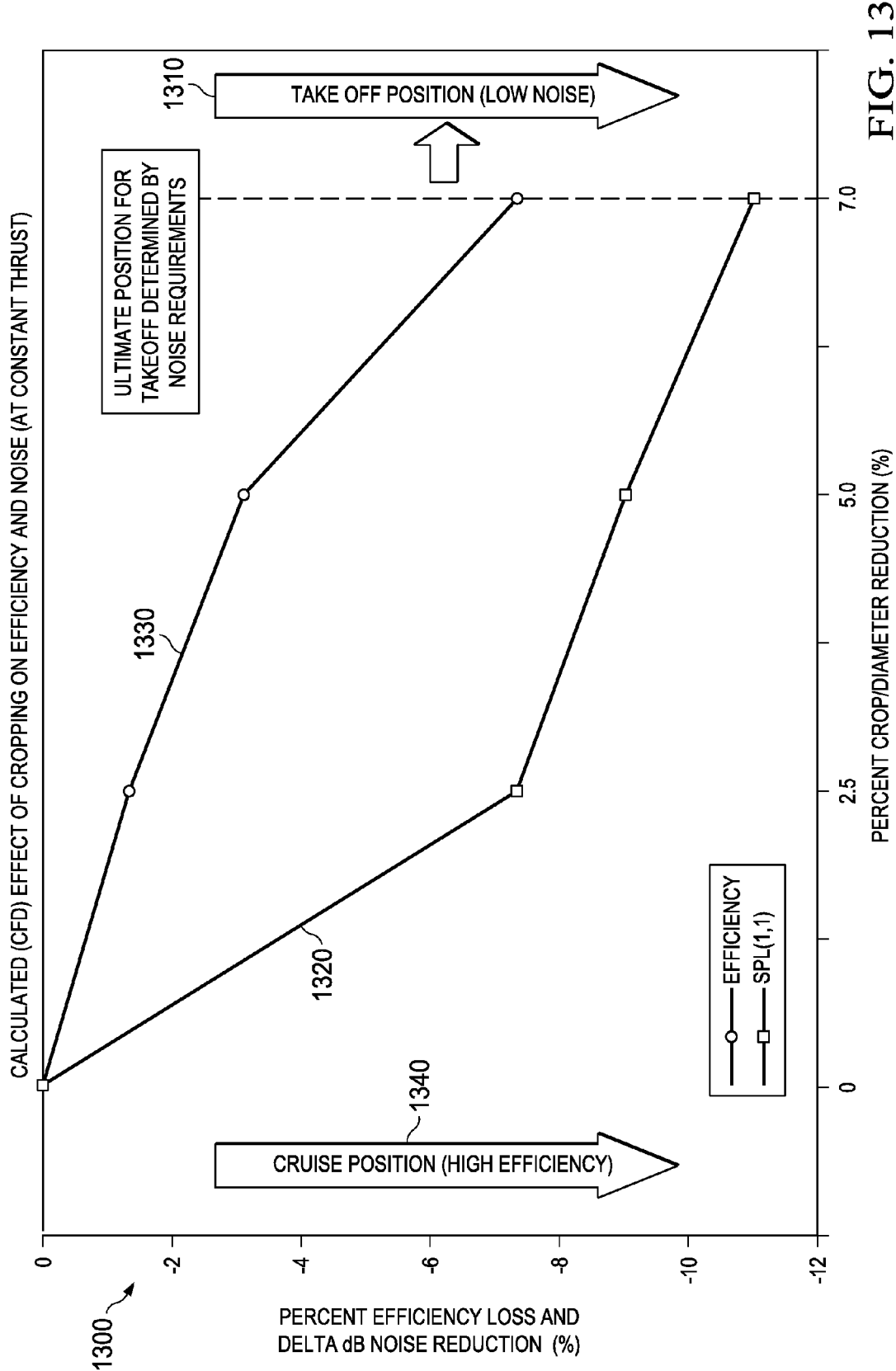
FIG. 13 is an illustration of a graph that depicts an exemplary relationship of the percent of cropping/diameter reduction of the downstream propeller of a contra-rotation open fan engine and the percent efficiency loss and Delta dB noise ratio.

In particular, FIG. 13 is an illustration of a graph showing an exemplary relationship of the percent of cropping/diameter reduction of the downstream propeller of a contra-rotation open fan engine and the percent efficiency loss and Delta dB noise ratio. The graph is generally designated by reference number 1300, and at the beginning of a takeoff and climb operation, wherein the downstream propeller blades are cropped such that the diameter of the downstream propeller is between ten and twenty percent less than the diameter of the upstream propeller, delta noise reduction, shown by curve 1320, is greater than ten percent and efficiency loss, indicated by curve 1330, is about five percent. As the amount of cropping of the downstream propeller blades is gradually reduced, however, the efficiency loss and the Delta noise reduction gradually decreases until at cruising speed, both efficiency loss and noise reduction is at zero. As indicated in FIG. 13, the shaded areas on either side of curves 1320 and 1330 represent a tolerance band about nominal trend.

As can be clearly seen from FIG. 13, by gradually increasing the length of the downstream propeller blades (i.e., the span or diameter of the downstream propeller), aircraft operating efficiency also gradually increases during the segment resulting in a reduction in fuel required for the mission.

As the downstream propeller blades are gradually extended in length during takeoff and climb of an aircraft, it is desirable that all the blades move in unison such that the length of all the blades of the downstream propeller are the same at all times to avoid imbalance issues. As described previously, the movement of each downstream propeller blade may be controlled by at least one electric motor. In accordance with an advantageous embodiment, however, a blade equalizer system may be provided to further ensure that the downstream propeller blades move in unison and are always of the same length in the event of failure in any part of the system or within an individual blade actuator. Furthermore, a beneficial feature of this advantageous embodiment pertains to engine-out scenarios. In the event any one of the airplane engines loses power, the downstream propeller diameter of the other engine(s) should be immediately increased to provide an incremental increase in thrust. Operationally, this would either be initiated when the pilot triggers the "toga" (take-off and go around) button; or automatically if the airplane flight computers are equipped with engine failure detection capabilities.

In an embodiment, at least one electric motor that may be similar to electric motor 1020a, electric motor 1020b, electric motor 1020c, and electric motor 1020d as provided in FIGS. 10B and 10C may be deployed in a manner different from embodiments previously provided herein. Electric motor 1020a, electric motor 1020b, electric motor 1020c, and electric motor 1020d may not engage with gears around an inside ring of second plate 1016 as previously described. Instead, a variable frequency starter generator motor housed in a core portion of the engine may be used. The starter generator motor may drive a shaft with a first gear that engages with a plate similar in appearance to second plate 1016 but located in direct contact with core portion of engine as opposed to placed on downstream propeller housing 1008 provided in FIGS. 10B and 10C. The starter generator motor may be an existing component with a primary function of starting a turbine of the engine. The starter generator motor may be adapted for the functionality provided herein.

Figure 14:
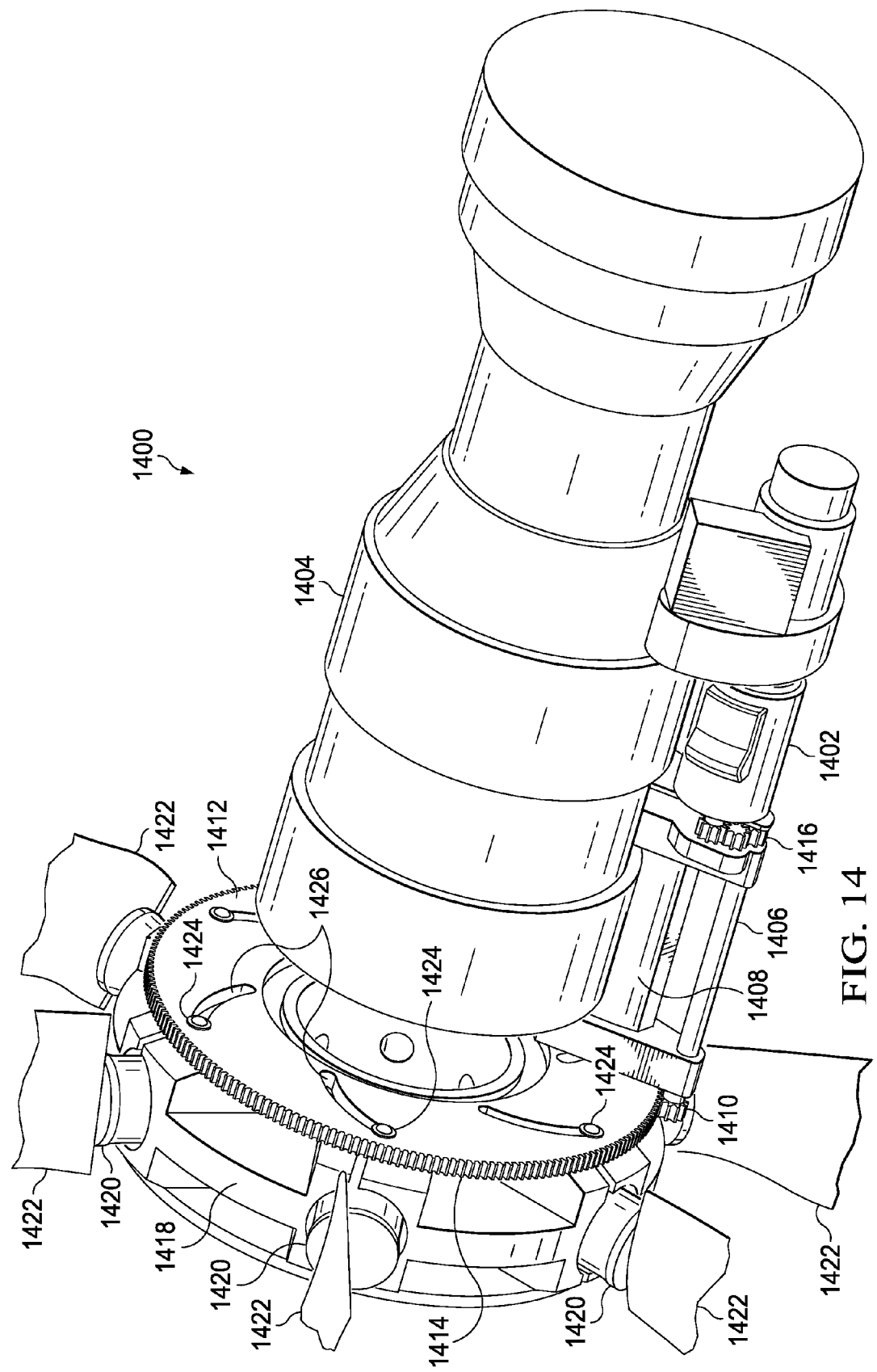
FIG. 14 is an illustration of a perspective view of the downstream propeller housing of the contra-rotation open fan engine illustrated in FIG. 7 with a housing cover plate removed to show features of a blade equalizer system in accordance with an advantageous embodiment.

FIG. 14 is an illustration of the interior of the downstream propeller housing of the propeller system illustrated in FIG. 7 to show a blade actuator system in accordance with an advantageous embodiment. In the embodiment depicted in FIG. 14, electric motors such as electric motor 1020a, electric motor 1020b, electric motor 1020c, and electric motor 1020d depicted in FIGS. 10B and 10C are not used in the arrangement depicted in FIGS. 10B and 10C. FIG. 14 instead depicts a system 1400 including starter generator motor 1402 that is attached to core 1404.

Shaft 1406 extends from starter generator motor 1402 in a direction away from core 1404. Shaft 1406 protrudes through guiding holes in bracket 1408 that itself is attached to core 1404. At end of shaft 1406 away from starter generator motor 1402 is first gear 1410. First gear 1410 engages with plate 1412. Plate 1412 is similar to second plate 1016 of FIG. 10B but is instead in the position of first plate 1002 of FIG. 10B. Plate 1412 is adjacent to core 1404 instead of situated in front of or on top of downstream propeller housing 1008 depicted in FIG. 10B. As opposed to second plate 1016 of FIG. 10B, plate 1412 has gear interface 1414 on its outside or external ring or edge. First gear 1410 engages with plate 1412 at gear interface 1414.

FIG. 14 also includes second gear 1416 which is located at base of shaft 1406, proximate starter generator motor 1402. Second gear 1416 turns shaft 1406 and first gear 1410 under power provided by starter generator motor 1402. Second gear 1416 determines direction with which shaft 1406 and first gear 1410 are turned. Direction with which shaft 1406 and first gear 1410 are turned determines direction in which plate 1412 is turned. Direction in which plate 1412 is turned determines whether pins 1424 are moved inward or outward toward or away from hub of propellers, thus determining retraction or extension, respectively.

Starter generator motor 1402 causes second gear 1416 to rotate. Second gear 1416 causes shaft 1406 to rotate. In an embodiment, shaft 1406 and first gear 1410 are a single continuous component such that rotation of shaft 1406 automatically causes first gear 1410 to rotate. Rotation of first gear 1410 and engagement of first gear 1410 with gear interface 1414 of plate 1412 causes plate 1412 to turn.

FIG. 14 also depicts components previously described in association with FIGS. 9A and 9B, FIGS. 10A, 10B, and 10C, and FIG. 11. FIG. 14 depicts downstream propeller housing 1418 that corresponds to downstream propeller housing 1108 of FIG. 11. FIG. 14 depicts blade root housings 1420 that corresponds to blade root housings 1114 of FIG. 11. FIG. 14 depicts propeller blades 1422 that correspond to propeller blades 1124 of FIG. 11. FIG. 14 depicts pins 1424 that correspond to pins 1010 depicted in FIG. 10B. FIG. 14 depicts slots 1426 that correspond to slots 1018 of FIG. 10A When plate 1412 is turned by action of first gear 1410, plate 1412 causes pins 1424 to move inward toward center of downstream propeller housing 1418 or outward away from center of downstream propeller housing 1418. Such inward or outward movement of pins 1424 is caused by pins 1424 being securely held in slots 1426 that are curved. Turning of plate 1412 and consequent movement of pins 1424 in slots 1426 causes pins 1424 to move inward or outward toward or away from center of downstream propeller housing 1418.

Inward or outward movement of pins 1424 causes blade root housings 1420, to which pins 1424 are attached, to move in a retracting or extending manner, respectively. Such retracting or extending movement of blade root housings 1420, causes propeller blades 1422, to which blade root housings 1420 are attached, to also move in a retracting or extending manner.

Figure 15:
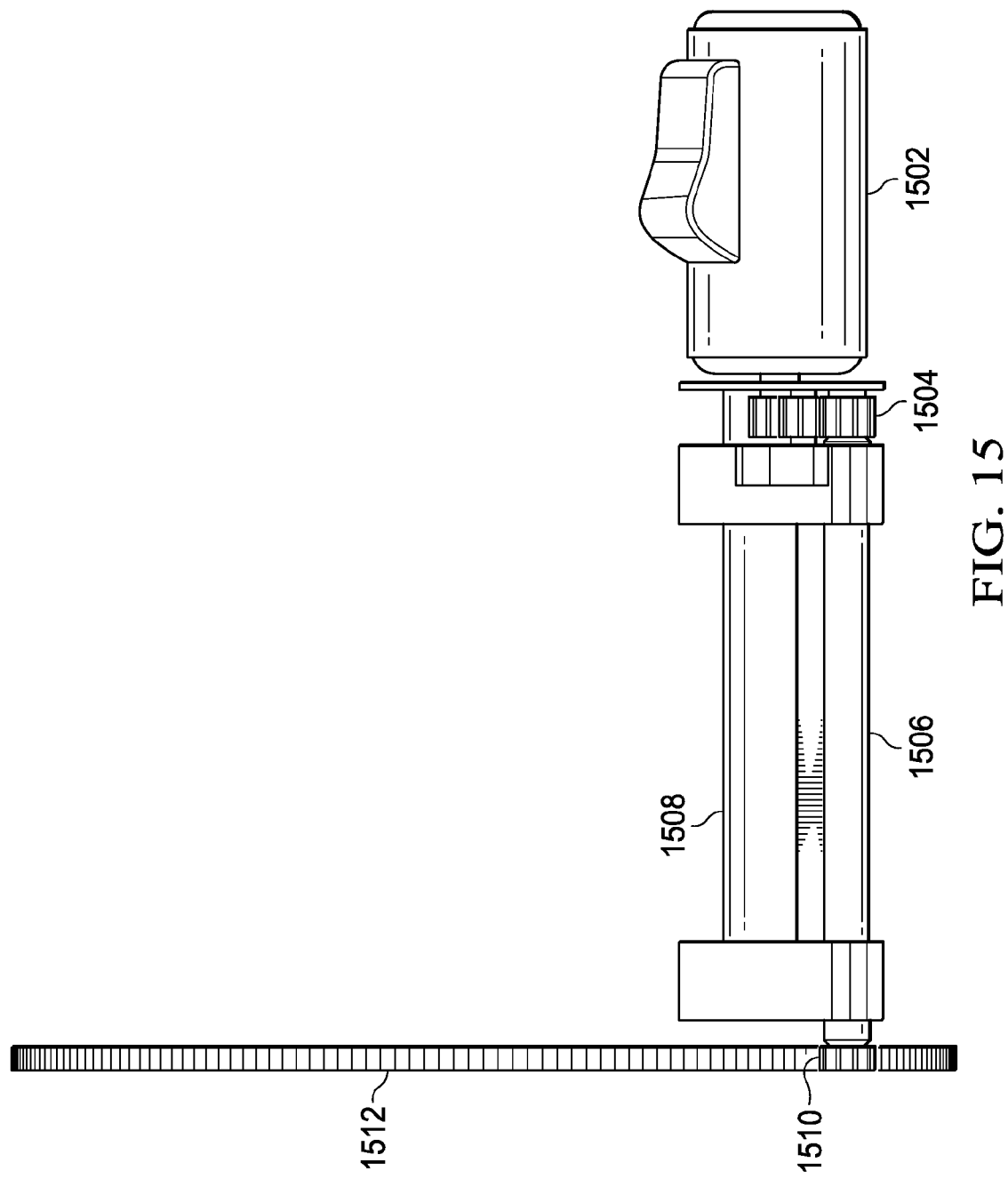
FIG. 15 is an illustration of the interior of the downstream propeller housing of the propeller system illustrated in FIG. 14 to show a blade actuator system in accordance with an advantageous embodiment.

FIG. 15 is an illustration of the interior of the downstream propeller housing of the propeller system illustrated in FIG. 14 to show a blade actuator system in accordance with an advantageous embodiment. FIG. 15 depicts starter generator motor 1502, second gear 1504, shaft 1506, bracket 1508, first gear 1510, and plate 1512 that correspond to starter generator motor 1402, second gear 1416, shaft 1406, bracket 1408, first gear 1410, and plate 1412 depicted in FIG. 12, respectively.

Figure 16:
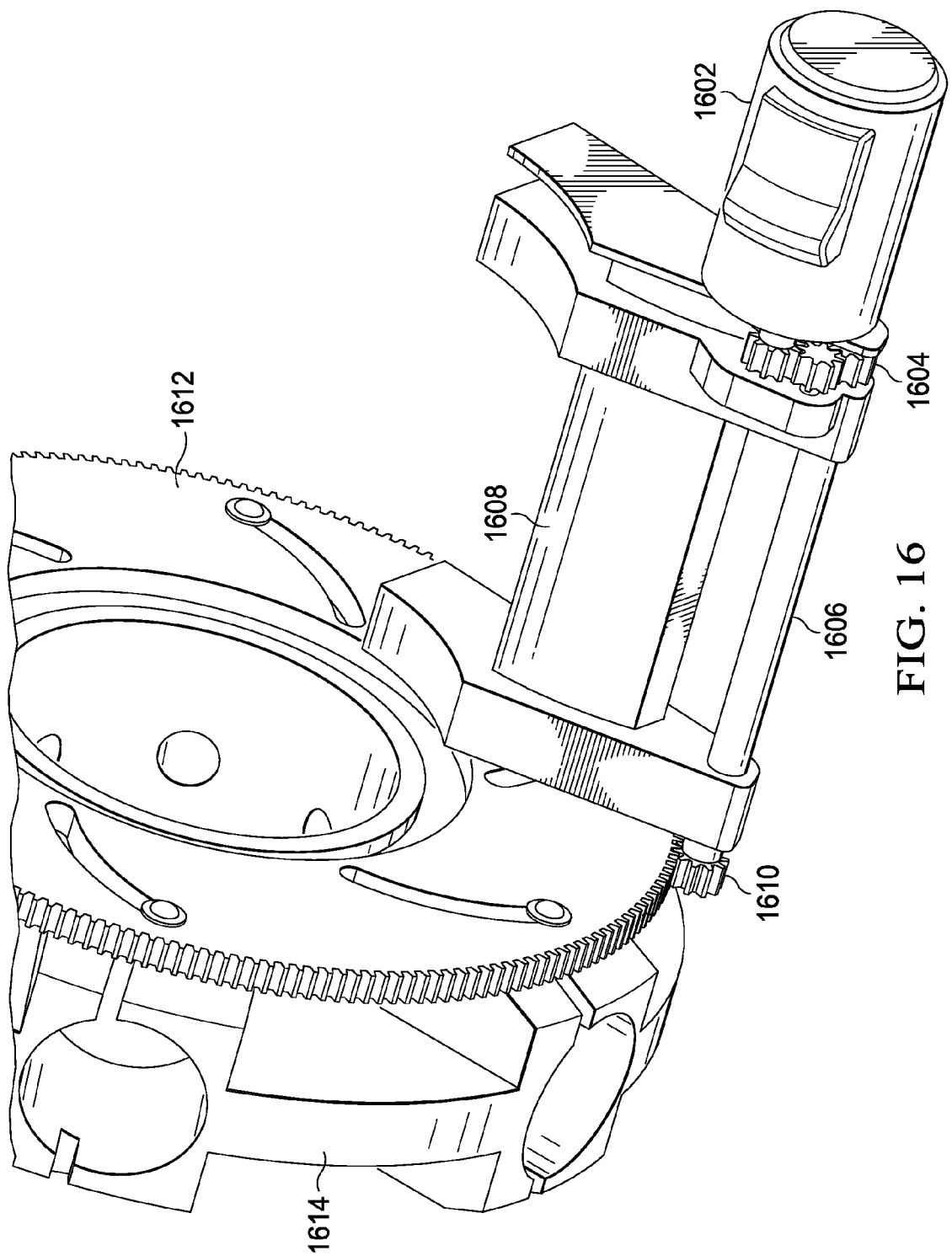
FIG. 16 is an illustration of the interior of the downstream propeller housing of the propeller system illustrated in FIG. 14 to show a blade actuator system in accordance with an advantageous embodiment.

FIG. 16 is an illustration of the interior of the downstream propeller housing of the propeller system illustrated in FIG. 14 to show a blade actuator system in accordance with an advantageous embodiment. FIG. 16 depicts starter generator motor 1602, second gear 1604, shaft 1606, bracket 1608, first gear 1610, plate 1612, and downstream propeller housing 1614 that correspond to starter generator motor 1402, second gear 1416, shaft 1406, bracket 1408, first gear 1410, and plate 1412 downstream propeller housing 1418 depicted in FIG. 14, respectively.

Figure 17:
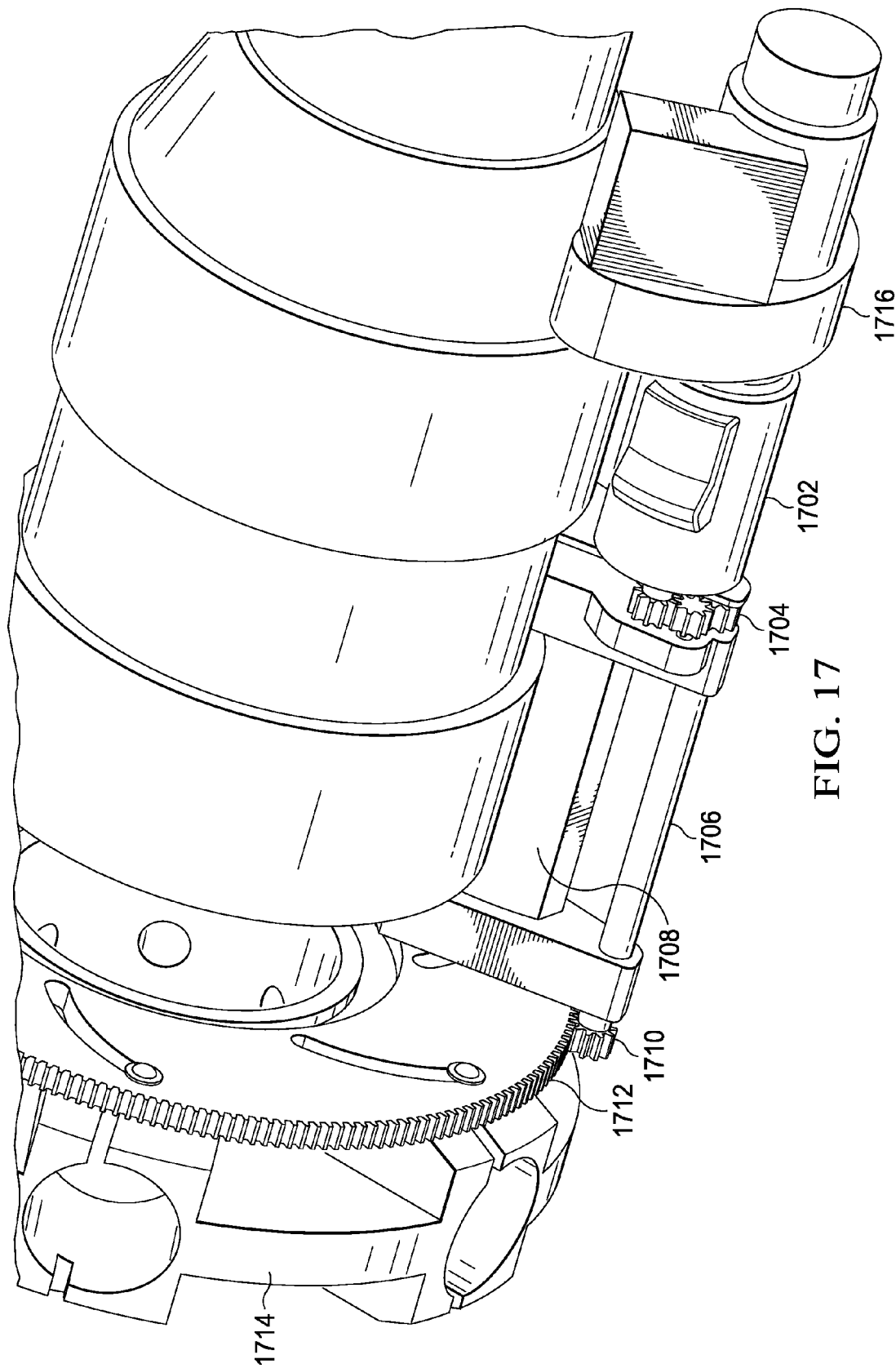
FIG. 17 is an illustration of the interior of the downstream propeller system illustrated in FIG. 14 to show a blade actuator system in accordance with an advantageous embodiment.

FIG. 17 is an illustration of the interior of the downstream propeller housing of the propeller system illustrated in FIG. 14 to show a blade actuator system in accordance with an advantageous embodiment. FIG. 17 depicts starter generator motor 1702, second gear 1704, shaft 1706, bracket 1708, first gear 1710, plate 1712, downstream propeller housing 1714, and core 1716 that correspond to starter generator motor 1402, second gear 1416, shaft 1406, bracket 1408, first gear 1410, plate 1412, downstream propeller housing 1418, and core 1404 depicted in FIG. 14, respectively.

The systems and methods provided herein may reduce downstream fan diameter during takeoff. Such reduction may be in accordance with locally-mandated diameters of stream-tube to reduce noise during takeoff. Some takeoff noise may be attributed to a phenomenon of downstream propeller cutting into stream-tube, commonly referred to as blade vortex interaction noise. The diameter of the downstream propeller may be increased during climb and cruise to improve performance and efficiency and reduce emissions.

A stream-tube circumscribes air passing through a fan disc. A ratio of stream-tube diameter in front of a propeller to stream tube diameter behind the propeller may be proportional to a ratio of forward airplane speed to speed of air accelerated by the propeller. Accordingly, at low speeds a stream-tube diameter may be large while at cruise a stream-tube diameter ratio may be close to one.

Use of electric actuation as provided herein may offer advantages related to maintenance and service as compared to other systems and methods. High pressure lubricants that may be required by other systems and methods may be associated with more frequent service and may involve complexities that require unscheduled service. Electrical actuation such as provided herein may improve on normal rate and sensitivity requirements that other non-electrical implementations may be subject to. Such improvements may better accommodate airports with complex noise monitoring systems where rapid or frequent propeller diameter changes may be required. Other implementations, for example hydro-mechanical actuation, may require additional intermediary components between hydraulic actuators and onboard computers than with electric actuation which may be digitally controlled in a more integrated system.

Downstream propellers may be fully retracted prior to takeoff. Flight management system 325 of FIG. 3 may signal at least one of electric motor 1020a, electric motor 1020b, electric motor 1020c, and electric motor 1020d or starter generator motor 1402 to automatically retract downstream propeller blades 1422 after the prior landing. However verification of a retracted state may be a normal step in the pre-flight process, similar to setting takeoff flaps. A function of the systems and methods provided herein is to gradually extend downstream propeller blades 1422 during climb once the aircraft clears noise-sensitive areas.

Turning now to FIG. 18, an illustration of a flowchart of a process for controlling a propeller in an aircraft engine of an aircraft is depicted in accordance with an advantageous embodiment. The process is generally designated by reference number 1800, and may be implemented in a CROF engine such as CROF engine 300 illustrated in FIG. 3 or CROF engine 408 or CROF engine 410 illustrated in FIG. 4, although it should be understood that it is not intended to limit advantageous embodiments to a CROF engine as advantageous embodiments may be used with other engines including single propeller engines. When implemented in a CROF engine, the operations of the process may be with respect to a downstream propeller of the CROF engine.

The process may begin by setting the diameter of a propeller of the CROF engine to be at a first diameter during at least a portion of a first flight condition of the aircraft (operation 1810). In accordance with advantageous embodiments, the first flight condition may, for example and without limitation, be a takeoff flight condition, a climb flight condition, a cruise flight condition, a descent flight condition, an altitude flight condition or a forward speed flight condition. The diameter of the propeller is then set to be at a second diameter, different than the first diameter, during at least a portion of a second flight condition of the aircraft (operation 1820). In accordance with advantageous embodiments, the second flight condition may, for example and without limitation, be a takeoff flight condition, a climb flight condition, a cruise flight condition, a descent flight condition, an altitude flight condition or a forward speed flight condition.

FIG. 19 is an illustration of a flowchart of a process for controlling a propeller in an aircraft engine of an aircraft in accordance with an advantageous embodiment. The process is generally designated by reference number 1900, and may be implemented in a CROF engine such as CROF engine 300 illustrated in FIG. 3, or one of CROF engine 408 or 410 illustrated in FIG. 4, although it should be understood that it is not intended to limit advantageous embodiments to a CROF engine as advantageous embodiments may be used with other engines including single propeller engines. When implemented in a CROF engine, the operations of the process may be with respect to a downstream propeller of the CROF engine.

The process may begin by operating a blade actuator system to set propeller blades of a propeller at a first retracted length prior to a takeoff and climb operation of an aircraft (operation 1910). In an advantageous embodiment, for example, the operation may be performed upon landing of the aircraft at the conclusion of a prior flight. After the propeller blades have been set at the first retracted length, operation of the blade actuator system is stopped (operation 1920), such that at the beginning of a takeoff and climb operation of the aircraft, the propeller blades will be at the first retracted length.

Following beginning of a takeoff and climb operation of the aircraft, operation of the blade actuator system is initiated to start increasing the length of the propeller blades in association with the takeoff and climb operation (operation 1930). This operation may be started, for example, when the aircraft reaches a typical take-off speed, for example and without limitation, a speed of Mach 0.3. At this time also, operation of an equalizer system that ensures that the blades lengthen uniformly and are always the same length may be initiated (operation 1940).

Operating of the blade actuator system is continued during at least a portion of the takeoff and climb operation to continue increasing the length of the propeller blades (operation 1950). In accordance with an advantageous embodiment, the propeller blades may be lengthened as a function of an increase in the speed of the aircraft during the takeoff and climb operation.

When the length of the propeller blades are at a second extended length, operation of the blade actuator system is stopped (operation 1960). In a CROF engine, for example, the second extended length may be a length at which the downstream propeller blades are substantially the same length as the upstream propeller blades. The second extended length may be reached, for example, when the speed of the aircraft reaches at or near a cruising speed, for example, Mach 0.8.

A pitch control system, which may be incorporated in the blade actuator system, may be operated to control the pitch of the propeller blades, if desired (operation 1970), and the operation ends.

In an embodiment, microphones, sensors, or other devices may be attached to a surface of an aircraft fuselage or embedded into skin of the fuselage. Such devices may detect noise or vibrations generated by propellers. The devices may report detected noises and vibrations to onboard systems and/or ground-based systems for analysis. Results of analysis may be used in making adjustments to systems and methods provided herein.

In an embodiment, designs for aircraft may be noise-shielded with engines installed over a wing or horizontal stabilizer, behind a vertical tail, or on any structure that serves as a barrier to obstruct noise. In such embodiments, installing acoustic sensors on fuselage surfaces may be desirable given the acoustic sensors may provide better characterization of Blade Vortex Interaction (BVI) noise.

A plurality of microphones may be embedded or attached at various predetermined distances and angles from aircraft engines and propellers. Noise and vibrations may be measured at each distance and angle with measurements sent to systems for analysis. A diameter of a down-stream propeller may be reduced to eliminate specific acoustic sources including tones formed when the down-stream propeller "cuts" the stream tube. Such reduction may reduce vibrations and noise and may be useful to an aircraft operator in complying with noise restrictions.

Figure 20:
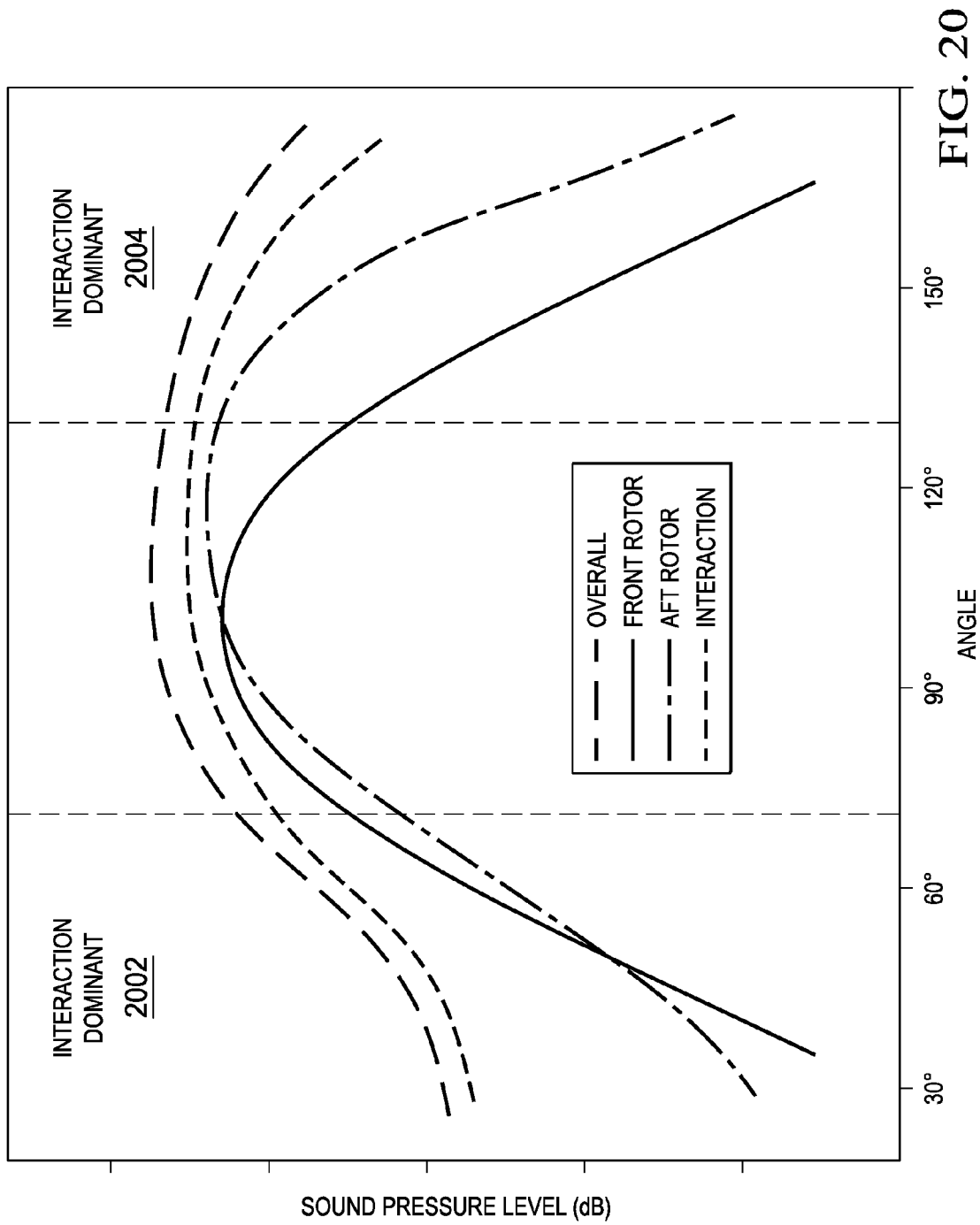
FIG. 20 is a graph depicting dominance of nearfield interaction tones when a stream tube is cut by a downstream rotor in accordance with an advantageous embodiment.

FIG. 20 is a graph depicting dominance of nearfield interaction tones when a stream tube is cut by a downstream rotor in accordance with an advantageous embodiment. Interaction tones may differ from blade/rotor noise tones. Rotor tones may generally be strongest in a geometric plane of a propeller while interaction tones may be stronger in other polar angles. Interaction tones may persist longer into the farfield where microphones may measure the interaction tones than rotor tones, increasing the importance of controlling interaction tones at their source.

FIG. 20 provides graph 2000 demonstrating that for angles less than 75 degrees and greater than 130 degrees, interaction tones may be dominant as noted by illustration numerals 2002 and 2004. As diameter of downstream propeller is reduced, interaction tones may fall to levels below other tones. Using measures of these levels combined with data about frequencies at which interaction tones are generated may enable determinations of when a stream-tube is being cut.

A propulsor is a term in the aviation fields that may encompass all components of an engine assembly that pertain to generation of forward (axial) thrust that moves an airplane through the air. Components of a propulsor may include a gas generator, strut/pylori and nacelle/nozzle in the case of a turbofan or gas generator, pylori/strut, and propeller or open fan in the case of turboprop or open fan engine.

Variable geometry propulsor control concepts in general usage may include schedules, formulae, or programs that describe a geometric configuration of a propulsor as a function of forward flight Mach or other parameters. Mach may be a dimensionless quantity representing the ratio of speed of an object moving through a fluid and the local speed of sound. The schedules, formulae, or programs may be implemented by onboard computers to alter the propulsor geometry to a configuration facilitating reduced noise. Such onboard computers may be flight management system 325 of FIG. 3 or a full authority digital engine (or electronics) control, commonly referred to as a FADEC. A FADEC may be a system consisting of digital computer, called an electronic engine controller or engine control unit, and its related accessories that control all aspects of aircraft engine performance.

The schedules, formulae, or programs that may be implemented by onboard computers must compensate for differences in aircraft weight, center of gravity, and thrust rating as well as random factors as wind gusts and minor changes in angle of attack that could result in an incidental event of excessive noise.

Changes in the shape of stream-tube may cause incidental chopping of the stream-tube. A relatively slight chopping of a stream-tube may cause enough additional source noise that the change in sound or delta-dB could be measured by an airport microphone and result in a noise violation.

Use of microphones or sensors attached to or embedded in a fuselage of an aircraft as provided herein may enable generation of feedback whereby at a constant throttle setting, noise in the near field on an aircraft structure may be steady. As diameter of downstream propeller increases and begins to cut the stream-tube, profound increases in interaction noise may be created which may be detectable.

Figure 21:
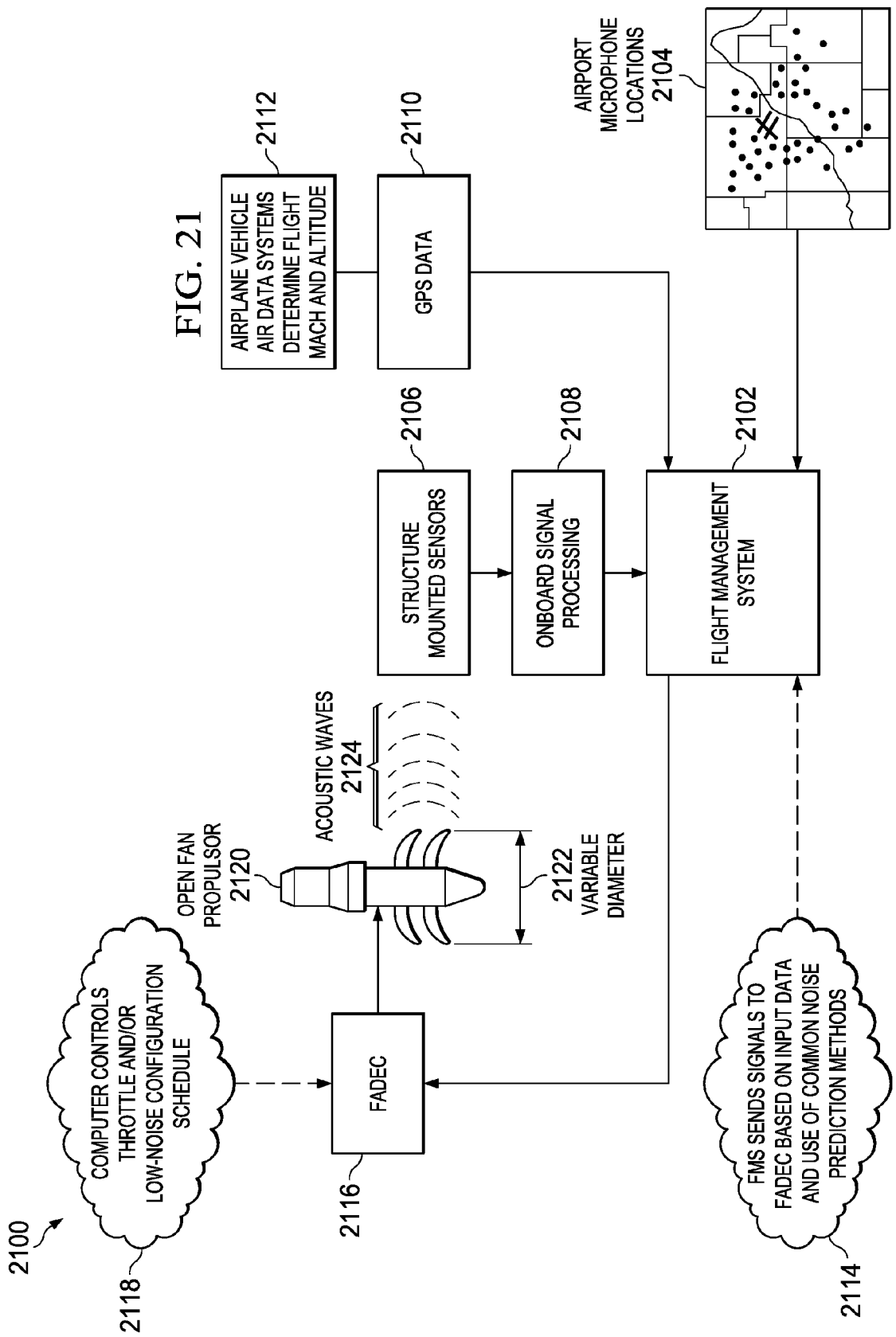
FIG. 21 is a flow diagram demonstrating use of in-flight acoustic data, microphone geometry data, and airplane position and speed data to control propulsor parameters to prevent airport noise violations in accordance with an advantageous embodiment.

FIG. 21 is a flow diagram demonstrating use of in-flight acoustic data, microphone geometry data, and airplane position and speed data to control propulsor parameters to prevent airport noise violations in accordance with an advantageous embodiment. A pilot or other operator may use components provided at least in FIG. 3 to complete at least some of the steps described in association with FIG. 21.

FIG. 21 provides process flow 2100 wherein flight management system 2102 receives inputs from various sources and issues instructions and information that may be used in making adjustments to downstream propeller diameter, throttle, and other aircraft settings that may reduce noise. Flight management system 2102 may correspond to flight management system 325 of FIG. 3. Flight management system 2102 receives airport microphone locations 2104, information from structure mounted sensors 2106, onboard signal processing 2108, and global positioning system (GPS) data 2110. Airplane vehicle air data systems determine flight Mach and altitude as noted at reference numeral 2112 and this information is also provided to flight management system 2102.

At 2114, flight management system 2102 sends signals to full authority digital engine control 2116 (FADEC) based on input data and use of common noise prediction methods. FADEC 2116 may be full authority digital engine (or electronics) control. Further, computer controls throttle and/or low-noise configuration schedule, designated in FIG. 21 with reference numeral 2118. Data associated with the controlling at 2118 may be provided to full authority digital engine control 2116 (FADEC).

Full authority digital engine control 2116 (FADEC) may issue commands to or otherwise influence operation of open fan propulsor 2120. Such operation may include adjusting variable diameter 2122 of open fan propulsor 2120. Acoustic waves 2124 are generated by open fan propulsor 2120 with magnitude and other attributes of acoustic waves 2124 being affected in part by variable diameter 2122. Acoustic waves 2124 are detected by structure mounted sensors 2106 and are provided to flight management system 2102 as previously described.

The operations described in FIG. 21 may be varied. For example, FIG. 21 may represent a continuous iterative process wherein the aircraft receives real time and other data, makes adjustments, receives further data, makes further adjustments, and so forth until at an altitude that clear of noise sensors.

Figure 22A:
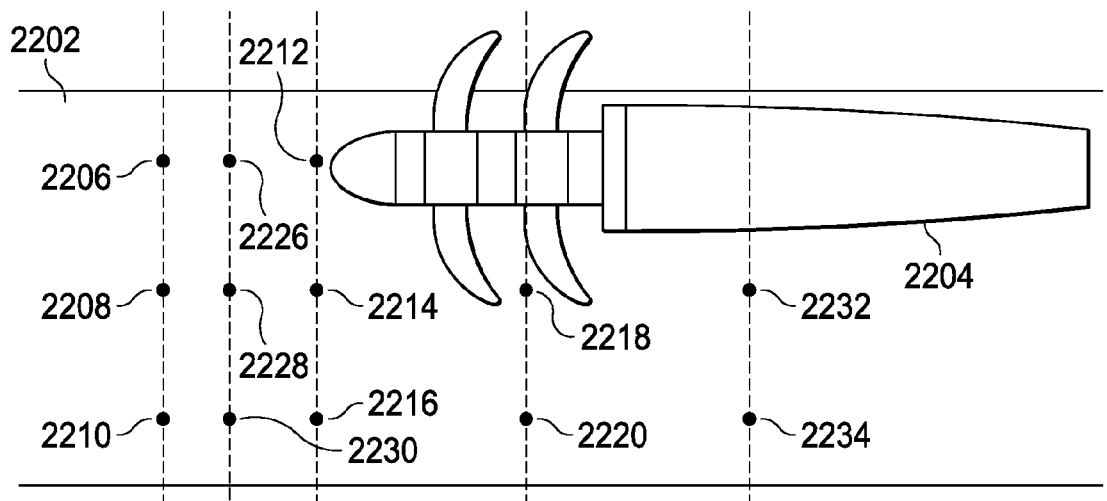
FIG. 22*a* is a diagram of an aircraft fuselage with microphones placed at various polar angles from an aircraft engine in accordance with an advantageous embodiment.

FIG. 22A is a diagram of an aircraft fuselage with microphones placed at various polar angles from an aircraft engine in accordance with an advantageous embodiment. Microphones and other sensors may be placed on the surface of or embedded into the fuselage such that changes in interaction noise that occur in known angular ranges from propulsors may be discerned from other noises. In an embodiment, microphones may be placed on or embedded in an aircraft fuselage at known polar angles locations from propulsors. The known polar angles may be angles at which stream-tube cutting highlights appreciable differences between stream-tube cutting and non-stream-tube cutting configurations. In a typical configuration, three microphones may be placed although more than or less than three microphones may be placed.

FIG. 22A depicts aircraft including fuselage 2202 and engine 2204. Nine microphones (eight visible) are placed on or in fuselage 2202. Microphone 2206, microphone 2208, and microphone 2210 are placed at variations of 45 degree angles from engine 2204. Microphone 2212, microphone 2214, and microphone 2216 are placed at variations of angles from engine 2204. Microphone 2218, microphone 2220, and a ninth microphone that is not visible in FIG. 23A but is obscured by engine 2204 are placed at variations of zero degree angles from engine 2204.

Data drawn from microphone 2206, microphone 2208, microphone 2210, microphone 2212, microphone 2214, microphone 2216, microphone 2218, microphone 2220, and the ninth microphone not visible in FIG. 22A may be gathered and analyzed by flight management system 2102 and full authority digital engine control 2116 (FADEC) of FIG. 21 as described in the discussion of FIG. 21 and elsewhere herein. The placement at different angles may provide insight into how noise radiated by engine 2204 disperses.

Figure 22B:
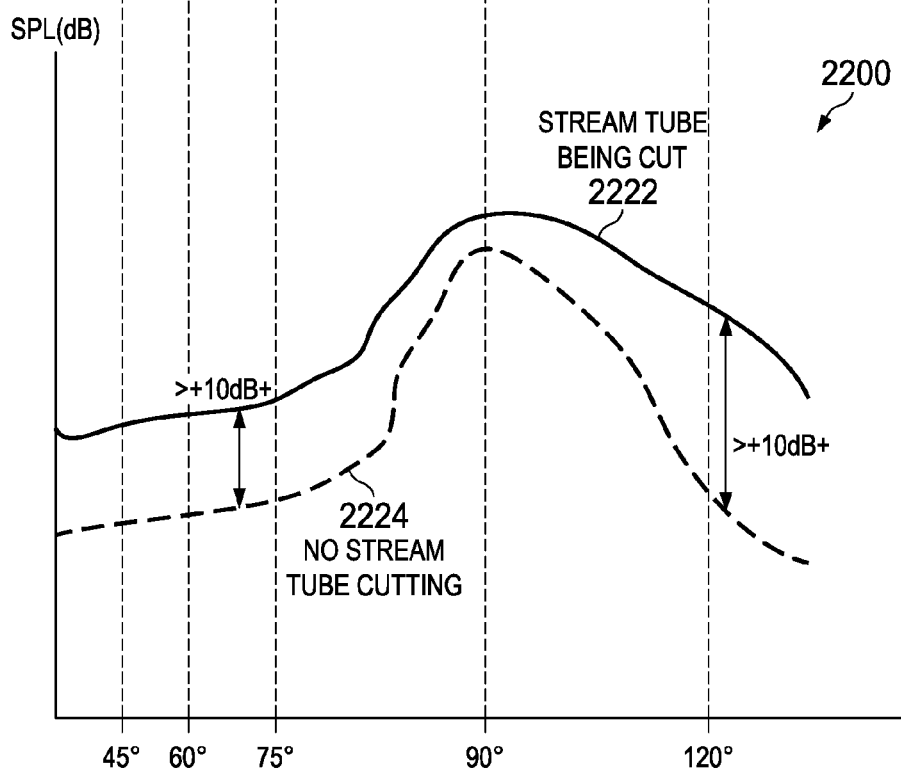
FIG. 22*b* is a graph illustrating noise generation and levels of stream tube cutting based on sound pressure levels and polar angles of microphone placement in accordance with an advantageous embodiment.

FIG. 22B is a graph illustrating noise generation and levels of stream tube cutting based on sound pressure levels and polar angles of microphone placement in accordance with an advantageous embodiment. FIG. 22b provides graph 2200 above fuselage 2202 wherein the x-axis of graph 2200 represents polar angles at which the various microphones may be placed on fuselage 2202. Vertical dotted lines from points on the x-axis intersect with the lines on graph 2200 for stream tube being cut 2222 and no stream tube cutting 2224 and demonstrate the effects of stream tube cutting.

Graph 2200 illustrates noise generation based on levels of cutting stream-tube in accordance in accordance with an advantageous embodiment. The graph 2200 depicts effects of stream tube cutting on sound pressure level, depicted in FIG. 22B as SPL[dB]. Plotted lines on graph 2200 depict SPL[dB] based on stream tube being cut 2222 and no stream tube cutting 2224.

Small degrees of stream-tube cutting may cause appreciable increases in noise. Acoustic sensors mounted on and/or embedded in an aircraft fuselage may detect slight intrusions of tips of downstream rotors into stream-tubes. Such detection may enable cessation of intrusion of rotor tips. A momentary halt to rotor tip extension may however be sufficient that stream-tube may gradually expand with increases of forward flight Mach.

Microphones or other sensors may begin collection data while an aircraft is still on the ground. Logic to control diameter of downstream propeller may take effect at a predetermined point after the aircraft leaves the ground. The predetermined point may be after obstacle clearance but probably before 700 foot altitude which may be the lowest altitude before certification or airport noise monitors begin to detect aircraft noise. Empirical data suggests that a 250 foot altitude may be a minimum altitude for change of propeller geometry.

A system of using microphones or other sensors attached to and/or embedded into an airplane fuselage as provided herein may be used as a novel way to control overall engine thrust to avoid airport noise monitor violations. Some airports use sophisticated microphone arrays with established noise limits to minimize a likelihood of unacceptable noise pollution in nearby communities. Causes of noise violations may be associated with inaccurate takeoff weight estimates or lack of precise departure profile management.

Source noise from an onboard system could be compared to real time airplane altitude and speed data to estimate levels of noise on the ground or levels of noise detected by a particular monitor on the ground. The flight management system 325 of FIG. 3 may then react by momentarily reducing thrust (and or change diameter and or pitch; in reality all could be done; the designer would have to determine priority between efficiency or noise; based on test data. See comments that follow) based on noise on the ground being more influenced by engine thrust than by altitude. The reduction of thrust may be necessary for only twenty to thirty seconds given the critical time window to influence lower noise measurements may often be brief.

Adaptations using phased array technology as well as augmentations to existing technology involving use of physical microphone location data may be useful in implementations of attached or embedded microphones or sensors as provided herein. While the use of phased array technology may require more complex onboard signal processing, phased array technology may provide additional information to facilitate more robust control of variable geometry features for reducing noise. In the case of physical microphone location data, aircraft location may be tracked via flight computer data and global positioning systems. Each airport has unique locations for its noise compliance monitoring which is public information. Near field noise measurements may be extrapolated in real time using common noise extrapolation codes. In an embodiment, public and/or private agencies or other entities may make available approved noise extrapolation codes. Extrapolation of near field noise measurements to predict noise levels at specific microphones on the ground.

Estimating takeoff weight of an airplane may be prone to error. Airlines may not weigh passengers. While there may exist reasonable rules of thumb, a heavier weight than anticipated may result in an airplane not reaching a planned altitude over a given ground microphone, which may result in a noise violation. Being able to predict ground noise from onboard estimates may provide flexibility to adjust throttle or propulsor noise control devices to compensate for an aircraft weighing more than anticipated.

Locations of microphones on or embedded in an aircraft fuselage or other aircraft structure may be established based on knowledge of locations of gaps in the stream tube cut and the stream tube not being cut. A designer or engineer may preferably place the microphones at polar angles where the noise difference is greatest. Those polar angles may register the most certain positive indications of stream tube cutting, polar angles where most stream tube cutting is converted into noise. Polar angles with differences of 6 dB may still be strategic. Polar angles depicted in FIG. 22A are shown for illustration purposes. Different engine designs may result in different optimal polar angles for microphones.

In an embodiment fuselage 2202 also has microphone 2226, microphone 2228, microphone 2230, microphone 2232, microphone 2234, and another microphone above microphone 2232 that is obscured in FIG. 22A by engine 2204.

Figure 23:
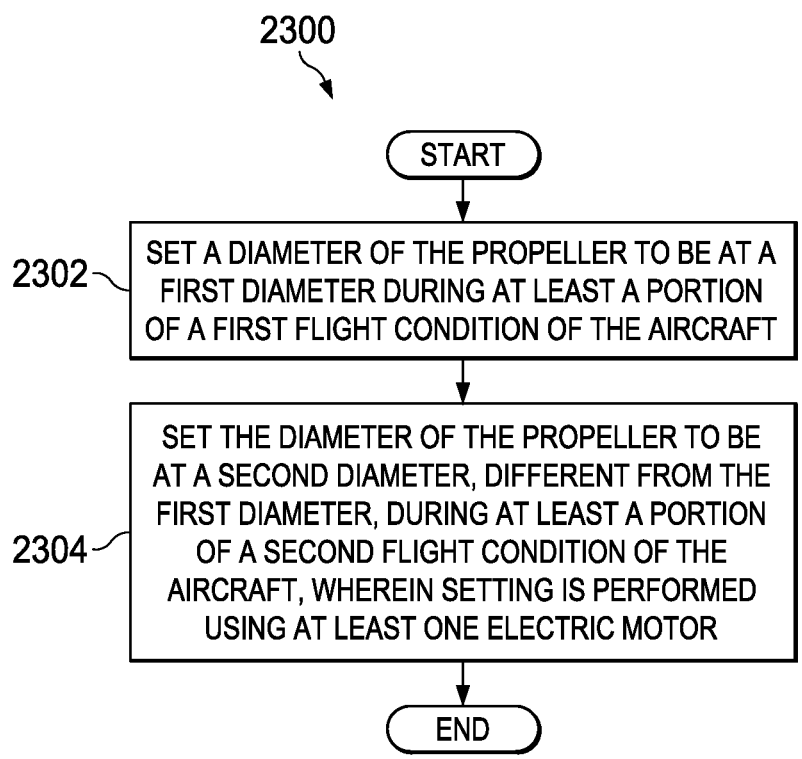
FIG. 23 is a flowchart of a method of optimization of downstream open fan propeller position in accordance with an illustrative embodiment.

FIG. 23 is a flowchart of a method of optimization of downstream open fan propeller position in accordance with an illustrative embodiment. The process shown in FIG. 23 may be a variation of the techniques described in FIG. 1 through FIG. 23. FIG. 23 is a flowchart of a method 2300 of controlling a propeller of a contra-rotation open fan (CROF) engine of an aircraft. Method 2300 shown in FIG. 23 may be implemented using CROF engine 300 of FIG. 3.

Although some of the operations presented in FIG. 23 are described as being performed by a "process," the operations are being performed by at least one tangible processor or using one or more physical devices, as described elsewhere herein. The term "process" also may include computer instructions stored on a non-transitory computer readable storage medium.

Method 2300 may begin the process may set a diameter of the propeller to be at a first diameter during at least a portion of a first flight condition of the aircraft (operation 2302). Next, the process may set the diameter of the propeller to be at a second diameter, different from the first diameter, during at least a portion of a second flight condition of the aircraft, wherein setting is performed using at least one electric motor (operation 2304). Method 2300 may terminate thereafter.

The description of the different advantageous embodiments has been presented for purposes of illustration and description, and is not intended to be exhaustive or limited to the embodiments in the form disclosed. Many modifications and variations will be apparent to those of ordinary skill in the art. For example, although described primarily in connection with a CROF aircraft engine, advantageous embodiments may be implemented in engines having only a single propeller. In this regard, single rotation propellers can have a very large diameter which may cause ground clearance issues. Advantageous embodiments may be used to reduce the diameter of such propellers while the aircraft is on the ground and during both takeoff and landing, and to increase the diameter of the propeller during flight to optimize efficiency of the aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a propeller of a contra-rotation open fan (CROF) engine of an aircraft, comprising:
    setting a diameter of the propeller to be at a first diameter during at least a portion of a first flight condition of the aircraft; and
    setting the diameter of the propeller to be at a second diameter, different from the first diameter, during at least a portion of a second flight condition of the aircraft, wherein setting is performed using at least one electric motor.

2. The method of claim 1, wherein the propeller comprises a downstream propeller of the contra-rotation open fan (CROF) engine.

3. The method of claim 2, wherein the first flight condition comprises a take-off and climb flight condition, and wherein setting the diameter of the downstream propeller to be at the first diameter during the at least a portion of the first flight condition of the aircraft comprises:
    setting the diameter of the downstream propeller to be at a first retracted diameter that is less than a diameter of an upstream propeller of the contra-rotation open fan CROF engine during at least a portion of the take-off and climb flight condition.

4. The method of claim 3, wherein the second flight condition comprises a cruising flight condition, and wherein setting the diameter of the downstream propeller to be at the second diameter, different from the first diameter, during the at least a portion of the second flight condition of the aircraft, comprises:
    setting the diameter of the downstream propeller to be at a second extended diameter that is substantially equal to the diameter of the upstream propeller of the contra-rotation open fan CROF engine during at least a portion of the cruising flight condition.

5. The method of claim 3, wherein setting the diameter of the downstream propeller to be at the first retracted diameter comprises:
    setting the diameter of the downstream propeller at the first retracted diameter prior to a takeoff and climb flight condition.

6. The method of claim 4, wherein setting the diameter of the downstream propeller to be at the second extended diameter that is substantially equal to the diameter of the upstream propeller of the contra-rotation open fan CROF engine during the at least a portion of the cruising flight condition, comprises:
    increasing the diameter of the downstream propeller during the at least a portion of the takeoff and climb flight condition.

7. The method of claim 6, wherein increasing the diameter of the downstream propeller during the at least a portion of the takeoff and climb flight condition comprises:
    increasing the diameter of the downstream propeller as a function of a speed of the aircraft during the at least a portion of the takeoff and climb flight condition.

8. The method of claim 6, wherein the downstream propeller comprises a plurality of propeller blades, and wherein:
    setting a diameter of the downstream propeller to be at the first retracted diameter comprises setting a length of each propeller blade of the plurality of propeller blades to be at a first retracted length; and
    increasing the diameter of the downstream propeller during the at least a portion of the takeoff and climb flight condition comprises increasing the length of each propeller blade of the plurality of propeller blades during the at least a portion of the takeoff and climb flight condition.

9. The method according to claim 8 further comprising:
    equalizing the increasing of the length of each propeller blade of the plurality of propeller blades such that the length of each propeller blade of the plurality of propeller blades increases in length in unison and each propeller blade of the plurality of propeller blades are always at substantially a same length.

10. The method according to claim 1, further comprising: adjusting a pitch of a propeller blade that is a component of a variable diameter system.

11. An apparatus, comprising:
a contra-rotation open fan (CROF) engine having a plurality of propellers; and
an electrically powered actuator for setting a diameter of a propeller of the plurality of propellers at a first diameter during at least a portion of a first flight condition of an aircraft, and for setting the diameter of the propeller to be at a second diameter, different from the first diameter, during at least a portion of a second flight condition of the aircraft.

12. The apparatus of claim 11, wherein the propeller comprises a downstream propeller of the plurality of propellers.

13. The apparatus of claim 12, wherein the first flight condition comprises a take off and climb flight condition, and wherein the first diameter comprises a first retracted diameter that is less than a diameter of an upstream propeller of the contra-rotation open fan (CROF) engine.

14. The apparatus of claim 13, wherein the second flight condition comprises a cruising flight condition, and wherein the second diameter comprises a second extended diameter that is substantially equal to the diameter of the upstream propeller of the contra-rotation open fan (CROF) engine.

15. The apparatus of claim 13, wherein the actuator setting the diameter of the downstream propeller to be at the second diameter, different from the first diameter, during the at least a portion of the second flight condition of the aircraft, comprises:
the actuator increasing the diameter of the downstream propeller during at least a portion of the takeoff and climb flight condition.

16. The apparatus of claim 15, wherein the actuator increasing the diameter of the downstream propeller during the at least a portion of the takeoff and climb flight condition, comprises:
the actuator increasing the diameter of the downstream propeller as a function of a speed of the aircraft during the at least a portion of the takeoff and climb flight condition.

17. The apparatus of claim 12, wherein the downstream propeller comprises a plurality of propeller blades, and wherein the actuator comprises a plurality of blade root housings, each blade actuator of the plurality of blade root housings controlling a length of a propeller blade of the plurality of propeller blades from a first retracted length to a second extended length.

18. The apparatus of claim 17 further comprising:
a blade equalizer system for ensuring that the length of each propeller blade of the plurality of propeller blades increases in length in unison and that each propeller blade of the plurality of propeller blades are always at substantially a same length.

19. The apparatus of claim 18, wherein the blade equalizer comprises:
a first plate having a plurality of lateral slots;
a second plate having a plurality of spiral curved slots aligned with the plurality of lateral slots to form a plurality of aligned slots;
a pin connected to each blade actuator and extending through a respective one of the plurality of aligned slots; and
a pitch control system for controlling a pitch of each propeller blade of the plurality of propeller blades, wherein the pitch control system comprises a rotatable plate connected to each blade actuator of the plurality of blade actuators.

20. An apparatus, comprising:
a contra-rotation open fan (CROF) engine having a plurality of propellers;
an electric-powered actuator configured to set a diameter of propellers at a first diameter during at least a portion of a first flight condition on an aircraft, and for setting the diameter of the propeller to be at a second diameter, different from the first diameter, during at least a portion of a second flight condition of the aircraft; and
a pitch control system configured to adjust a pitch of each propeller blade of a plurality of propeller blades.

* * * * *